(12) United States Patent
Balaji et al.

(10) Patent No.: US 12,527,471 B2
(45) Date of Patent: Jan. 20, 2026

(54) METHOD AND SYSTEM FOR MONITORING CORNEAL TISSUE HEALTH

(71) Applicant: W. L. Gore & Associates, Inc., Newark, DE (US)

(72) Inventors: Gopalan V. Balaji, Kennett Square, PA (US); Jose J. de la Cruz, Chicago, IL (US); Theodore C. Fleck, Newark, DE (US); Genevieve M. Gurczenski, Elkton, MD (US); Thomas B. Schmiedel, Middletown, DE (US); Esen K. Akpek, Baltimore, MD (US)

(73) Assignees: W. L. Gore & Associates, Inc., Newark, DE (US); The Johns Hopkins University, Baltimore, MD (US)

( * ) Notice: Subject to any disclaimer, the term of this patent is extended or adjusted under 35 U.S.C. 154(b) by 611 days.

(21) Appl. No.: 17/947,646

(22) Filed: Sep. 19, 2022

(65) Prior Publication Data
US 2023/0086902 A1 Mar. 23, 2023

Related U.S. Application Data

(60) Provisional application No. 63/388,094, filed on Jul. 11, 2022, provisional application No. 63/276,221, (Continued)

(51) Int. Cl.
*A61B 3/10* (2006.01)
*A61B 3/107* (2006.01)
*G16H 50/20* (2018.01)

(52) U.S. Cl.
CPC ............ *A61B 3/1005* (2013.01); *A61B 3/102* (2013.01); *A61B 3/107* (2013.01); *G16H 50/20* (2018.01)

(58) Field of Classification Search
CPC ..... A61B 3/0025; A61B 3/1005; A61B 3/102; A61B 3/107; G16H 50/20; G06T 7/0012; G06T 2207/10101; G06T 2207/30041
See application file for complete search history.

(56) References Cited

U.S. PATENT DOCUMENTS 9,655,512 B2   5/2017   Huang et al.
10,368,735 B2   8/2019   Abou et al.
(Continued)

FOREIGN PATENT DOCUMENTS

BR   112019014353 A2   2/2020
BR   112021001576 A2   4/2021
(Continued)

OTHER PUBLICATIONS

International Search Report and Written Opinion received for PCT Patent Application No. PCT/US2022/043982, mailed on Dec. 9, 2022, 8 pages.
(Continued)

*Primary Examiner* — Jack Dinh
(74) *Attorney, Agent, or Firm* — Nelson Mullins Riley & Scarborough LLP

(57) ABSTRACT

Methods, apparatuses, and systems for monitoring health of corneal tissue are disclosed. The system includes a corneal measurement device configured to measure a first state of health indicator that is tissue opacity or density of a region of the corneal tissue during a first period of time and a second state of health indicator that is tissue opacity or density of the region during a second period of time after the first period of time. The system further includes a processing unit configured to receive the first and second state of health indicators from the corneal measurement device and generate a health map of the region based on the first and second state of health indicators, the health map indicative of a change between the first and second state of health indica-
(Continued)

tors as measured from the first period of time to the second period of time in the region of the cornea.

**17 Claims, 21 Drawing Sheets
(4 of 21 Drawing Sheet(s) Filed in Color)**

Related U.S. Application Data filed on Nov. 5, 2021, provisional application No. 63/246,219, filed on Sep. 20, 2021.

(56) References Cited

U.S. PATENT DOCUMENTS

| | | |
|---|---|---|
| 10,468,142 B1 | 11/2019 | Abou et al. |
| 10,818,398 B2 | 10/2020 | Abou et al. |
| 2013/0128222 A1 | 5/2013 | Huang et al. |
| 2018/0000342 A1 | 1/2018 | Tang et al. |
| 2018/0192866 A1 | 7/2018 | Abou et al. |
| 2018/0365833 A1 | 12/2018 | Dhaini et al. |
| 2019/0090733 A1 | 3/2019 | Walsh et al. |
| 2019/0209006 A1 | 7/2019 | Abou et al. |
| 2020/0013514 A1 | 1/2020 | Roy et al. |
| 2020/0035362 A1 | 1/2020 | Abou et al. |
| 2020/0054208 A1 | 2/2020 | Tang et al. |
| 2021/0057103 A1 | 2/2021 | Abou et al. |
| 2023/0101480 A1 | 3/2023 | Akpek et al. |

FOREIGN PATENT DOCUMENTS

| | | |
|---|---|---|
| CA | 3049256 A1 | 7/2018 |
| CA | 3107530 A1 | 1/2020 |
| EP | 3568059 A1 | 11/2019 |
| EP | 3595535 A1 | 1/2020 |
| EP | 3830838 A1 | 6/2021 |
| IN | 201741008796 | 9/2018 |
| JP | 2020-506743 A | 3/2020 |
| KR | 10-2297946 B1 | 9/2021 |
| WO | 2018/132621 A1 | 7/2018 |
| WO | 2018/167696 A1 | 9/2018 |
| WO | 2019/157113 A1 | 8/2019 |
| WO | 2020/023959 A1 | 1/2020 |
| WO | 2021/021657 A1 | 2/2021 |

OTHER PUBLICATIONS

International Search Report and Written Opinion received for PCT Patent Application No. PCT/US2022/043989, mailed on Dec. 19, 2022, 9 pages.

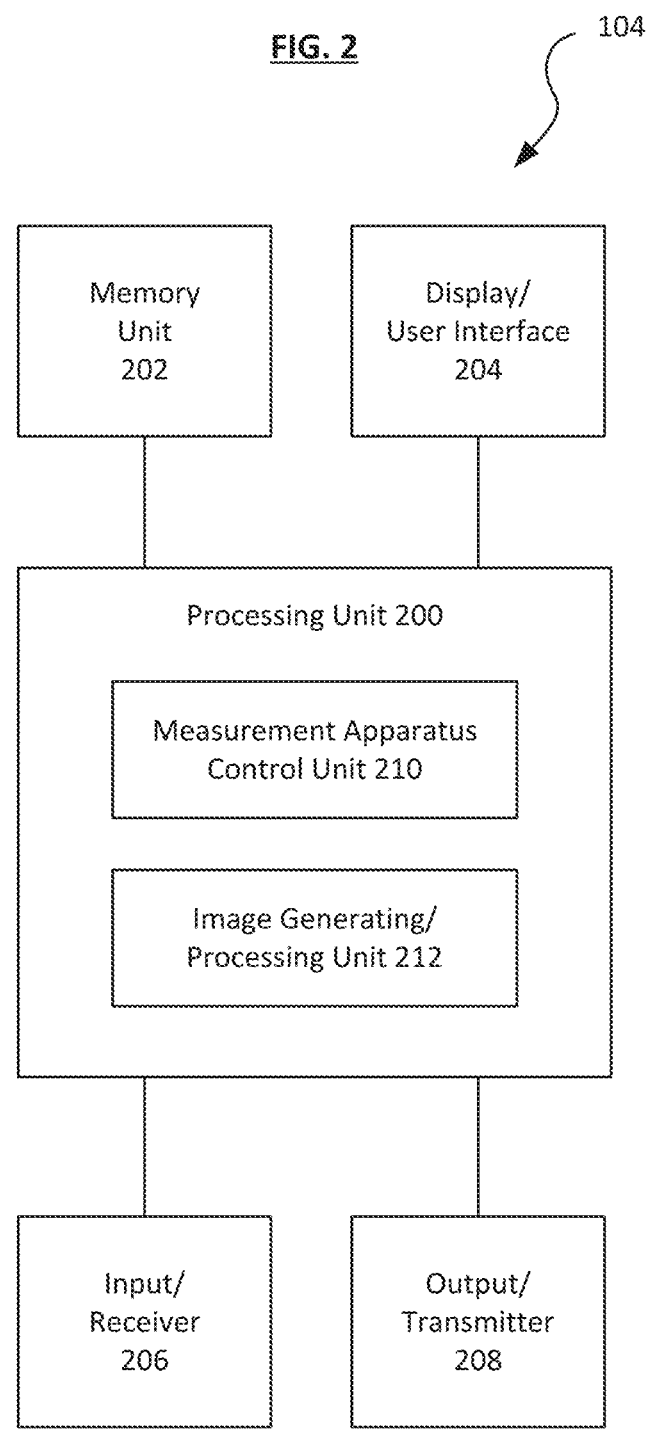

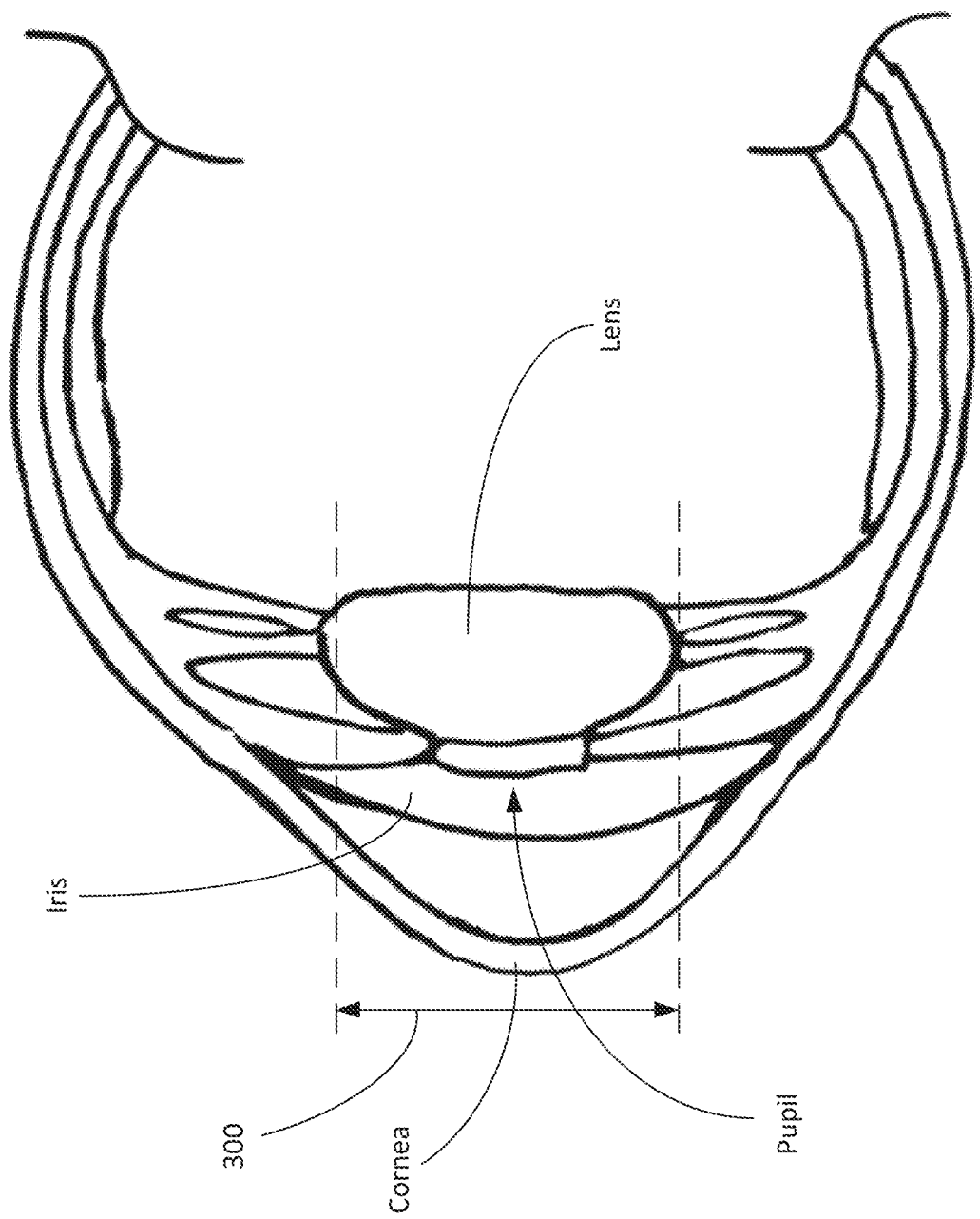

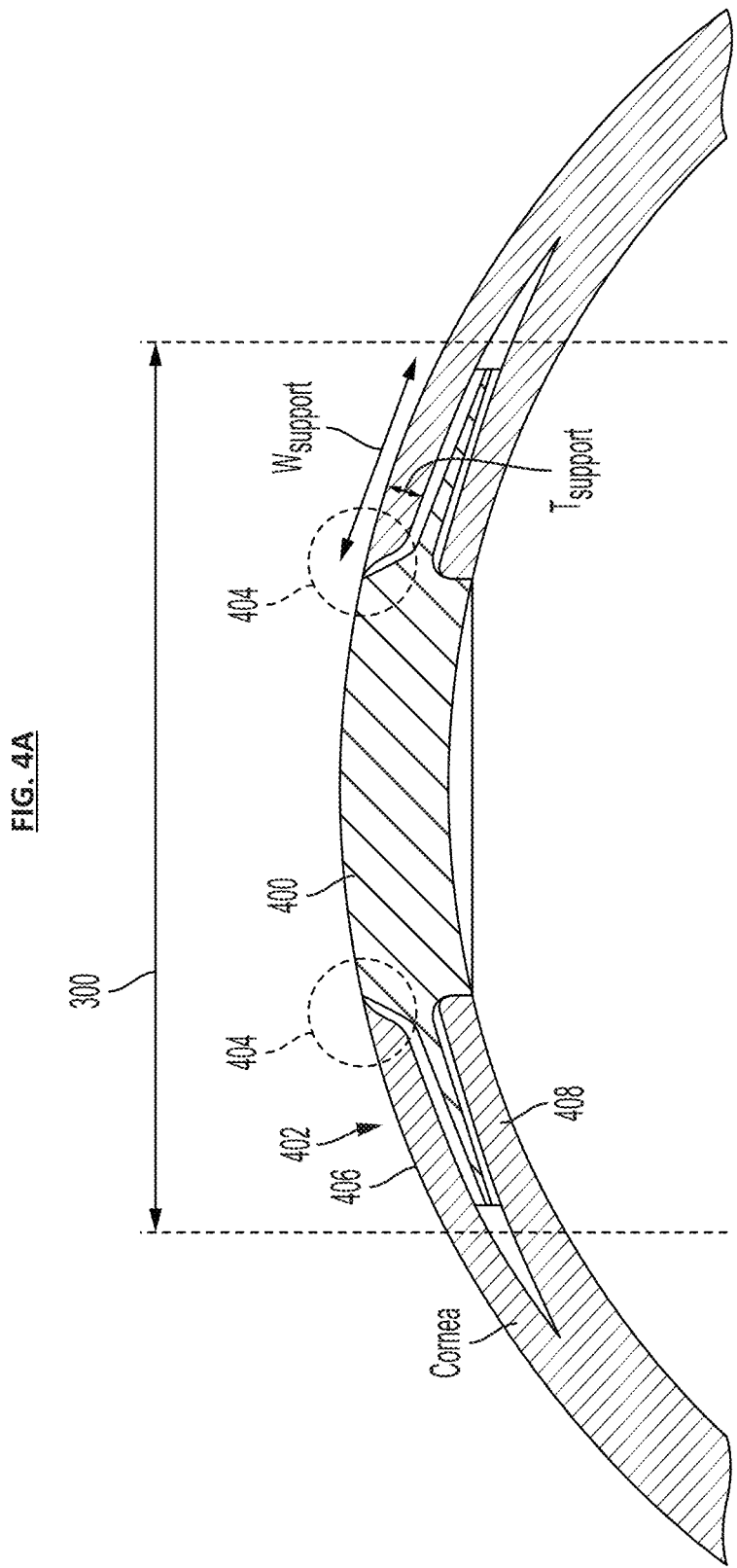

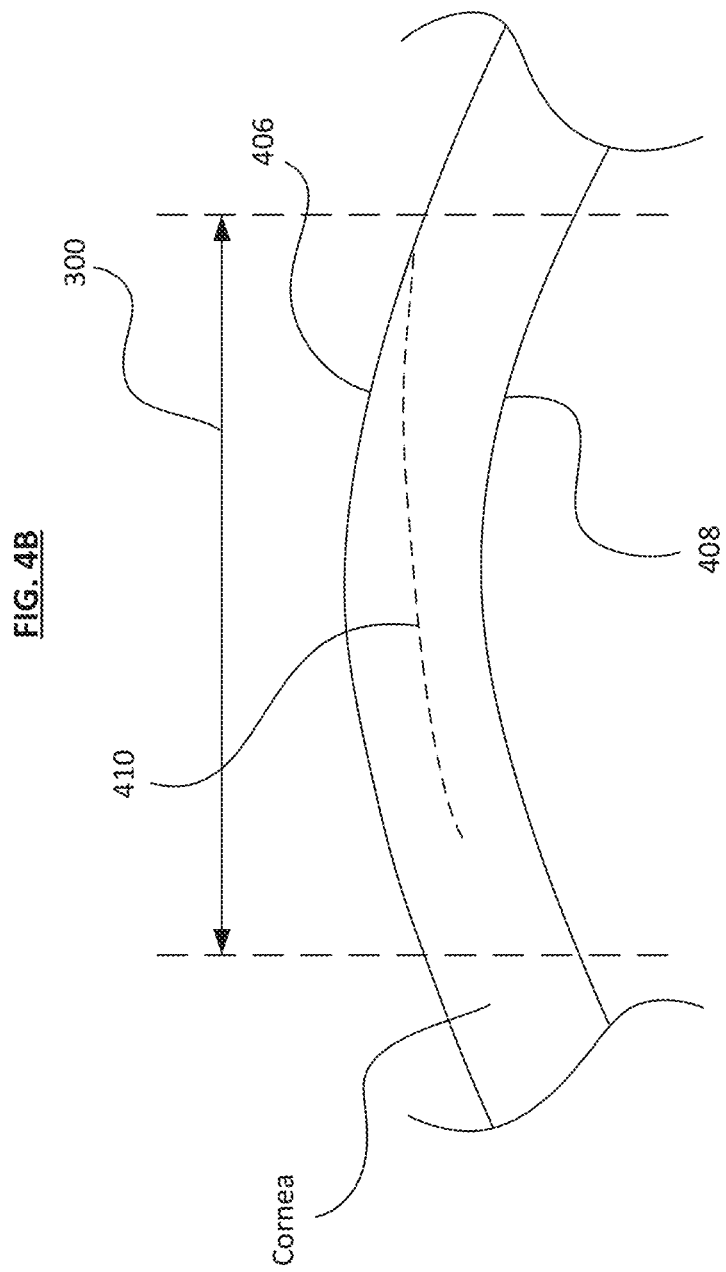

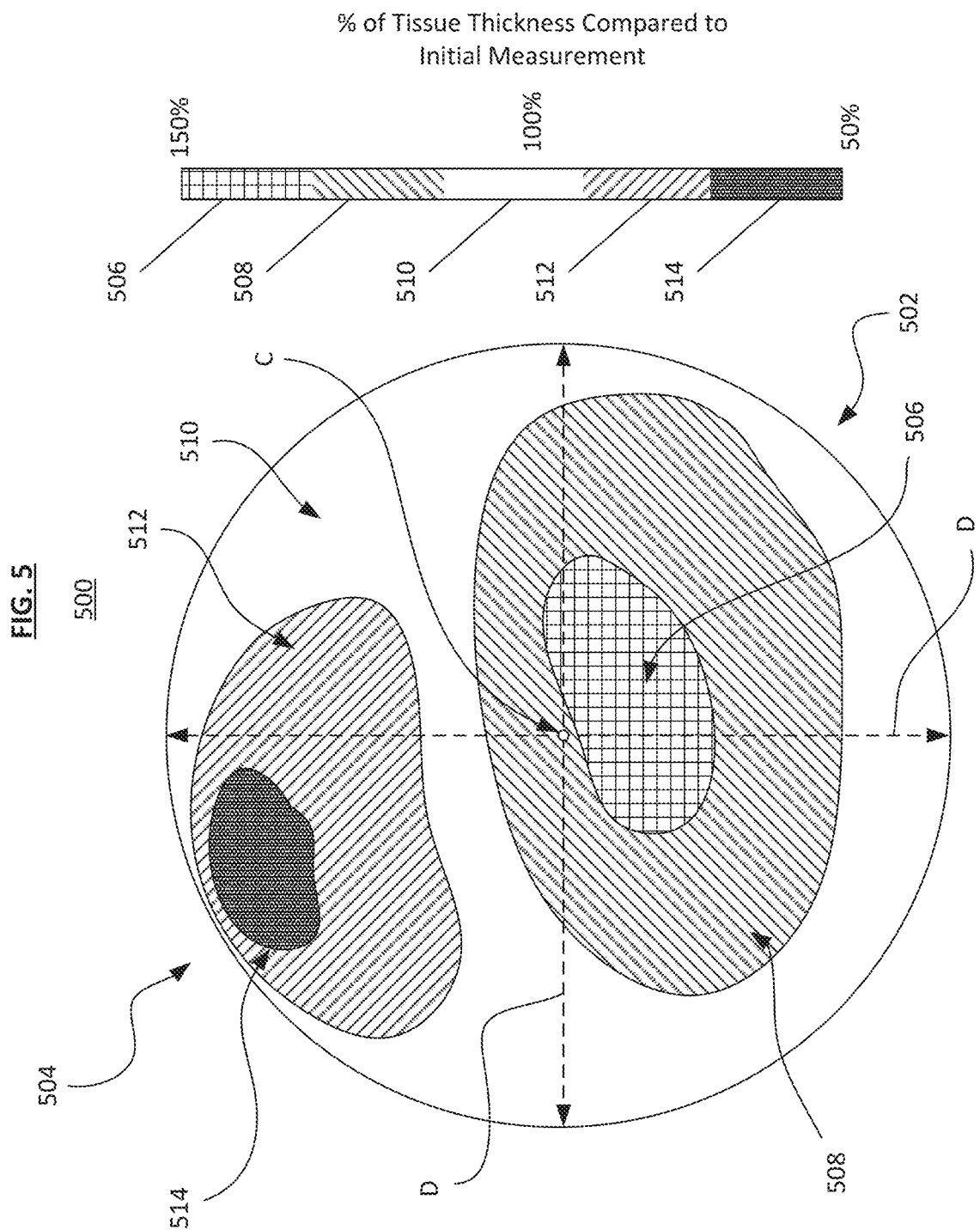

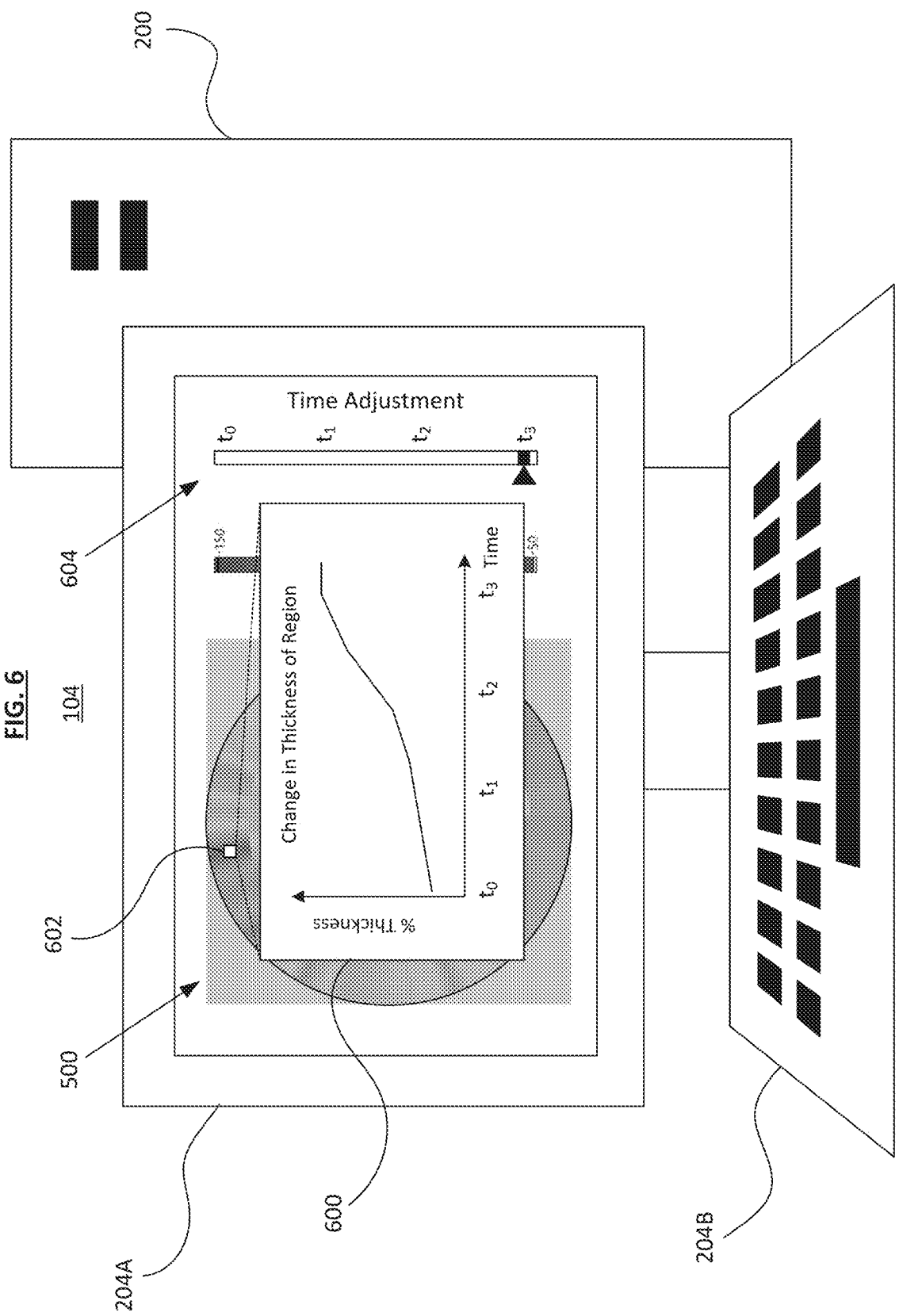

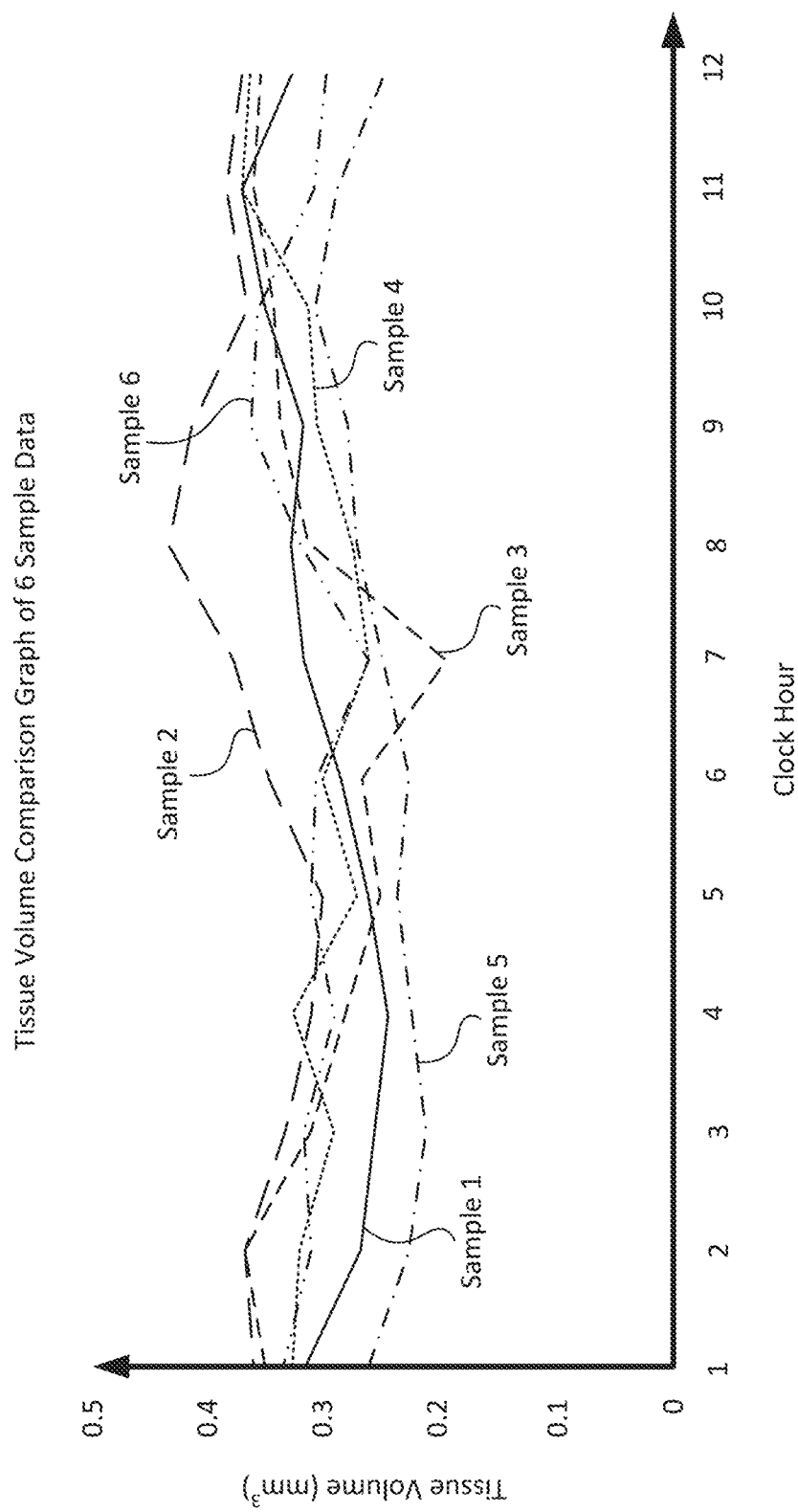

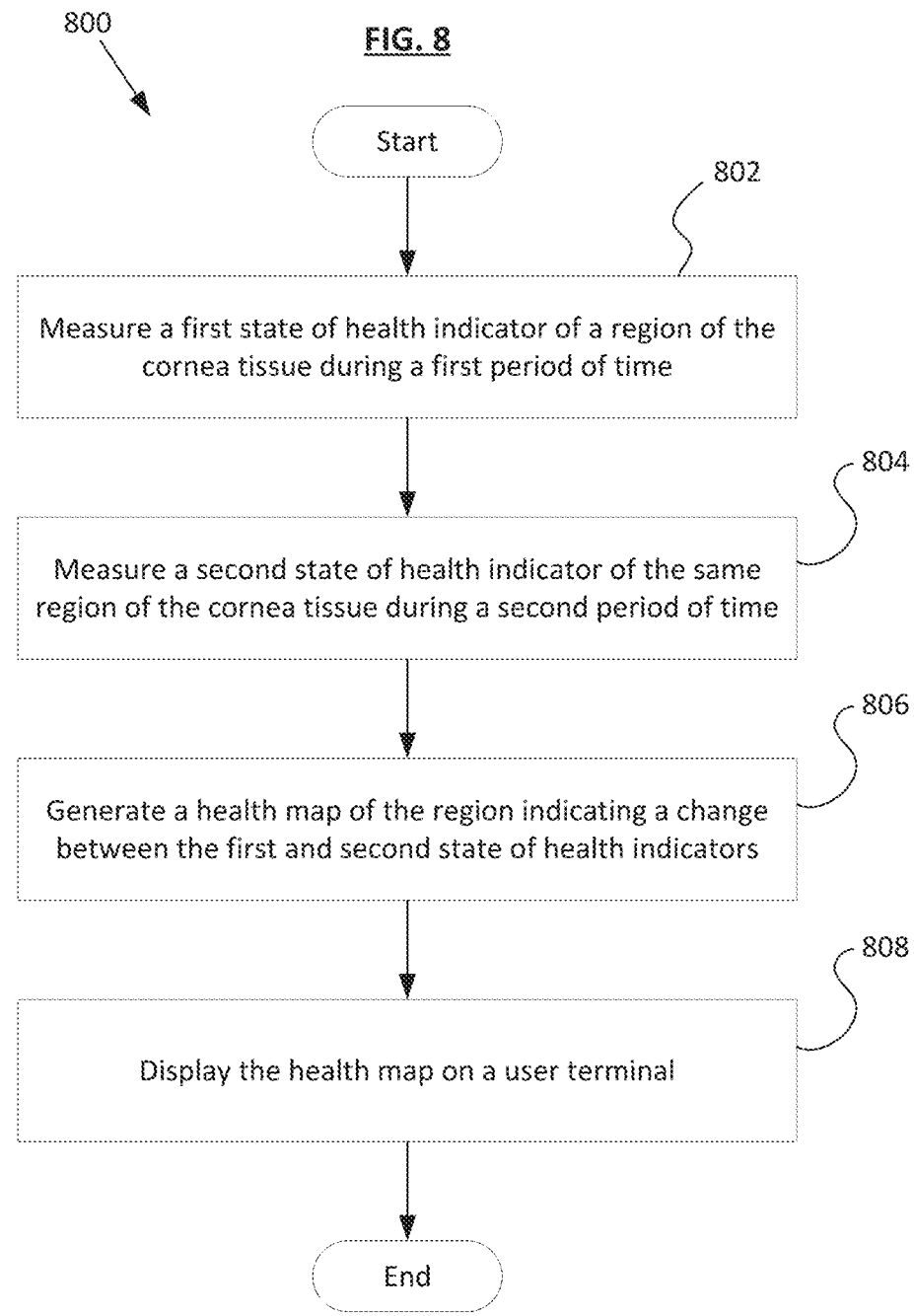

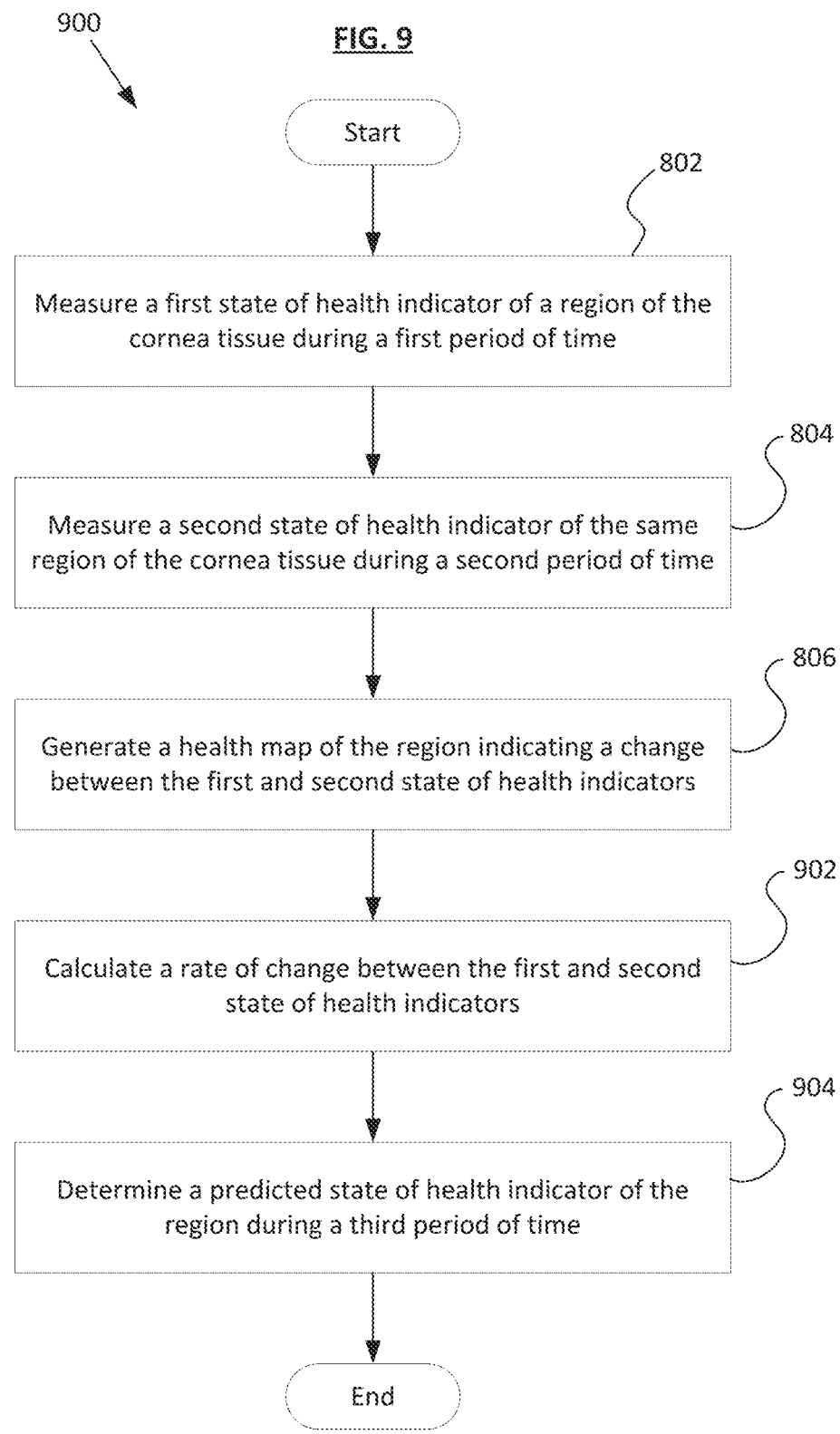

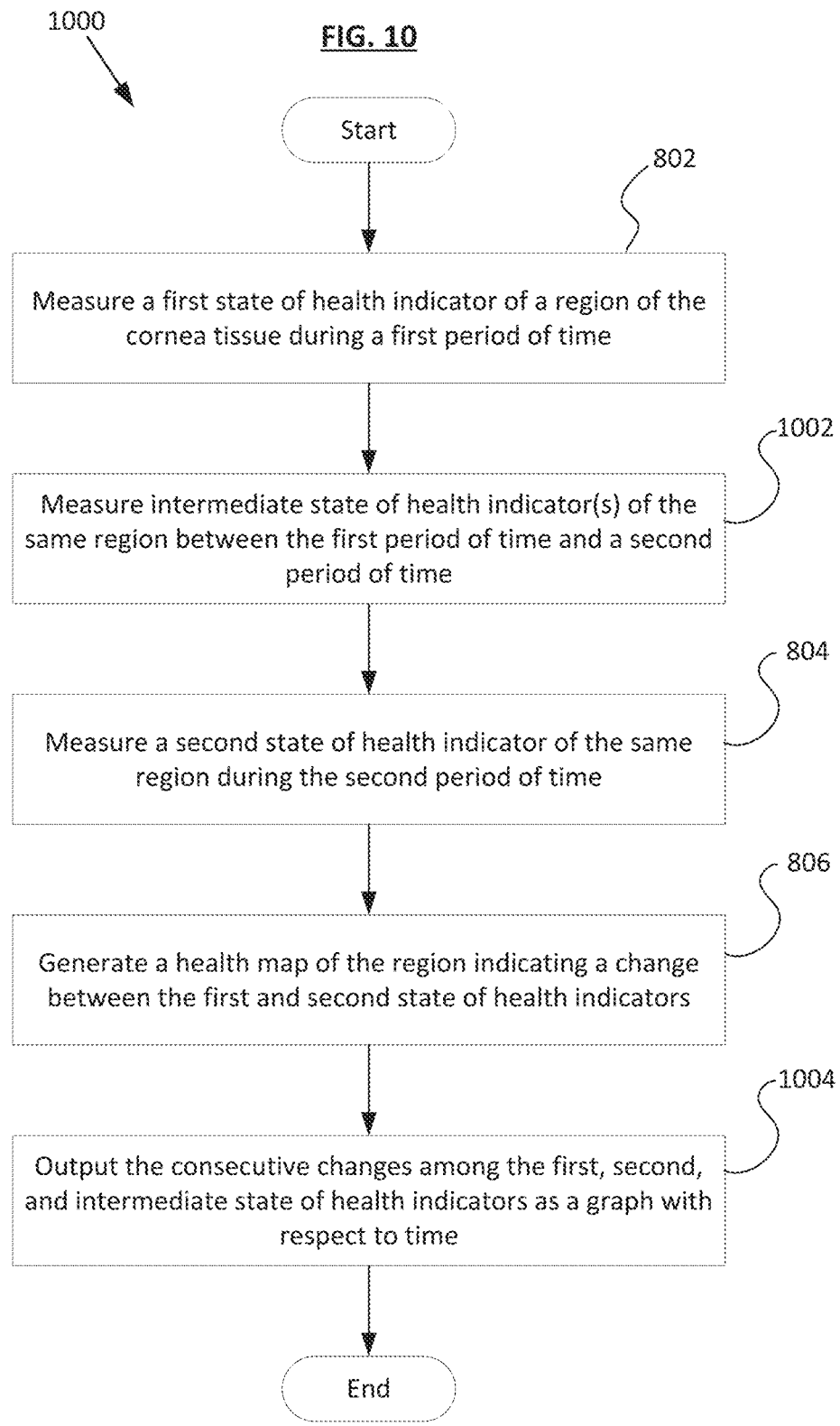

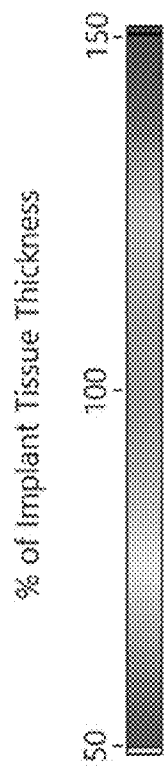
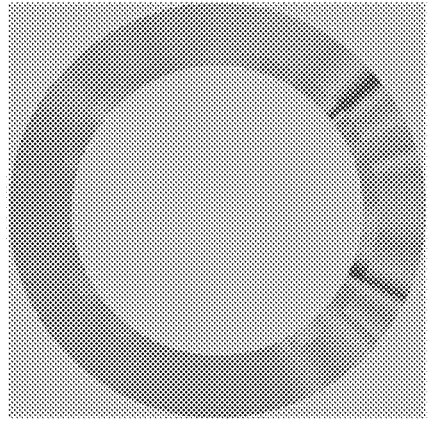
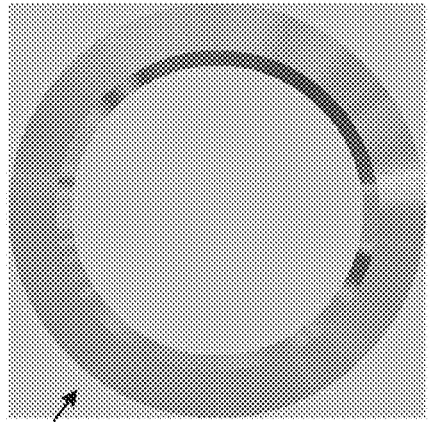
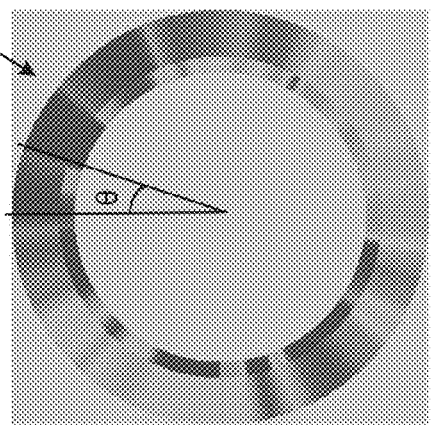
FIG. 11A
FIG. 11B
FIG. 11C
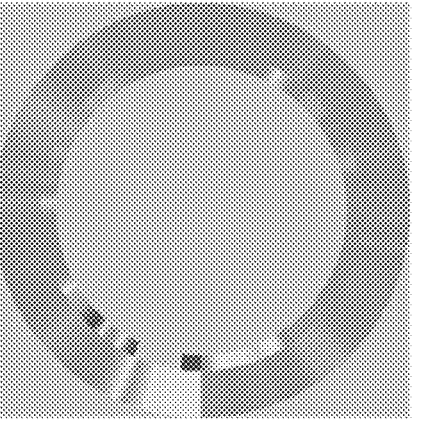
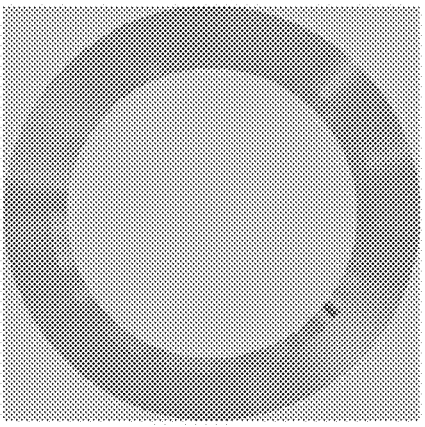
FIG. 11D
FIG. 11E
FIG. 11F

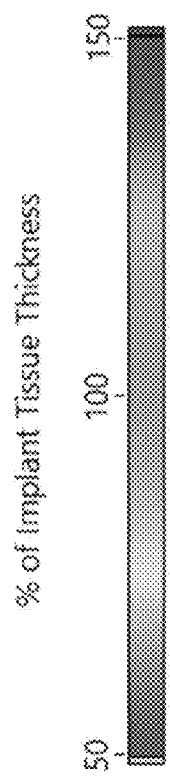
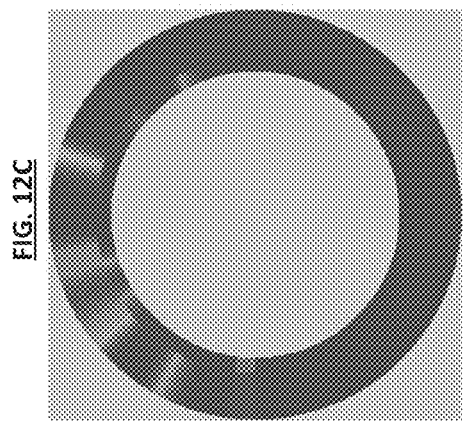
FIG. 12C
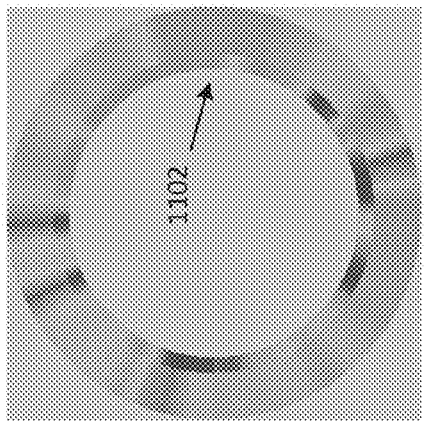
FIG. 12F
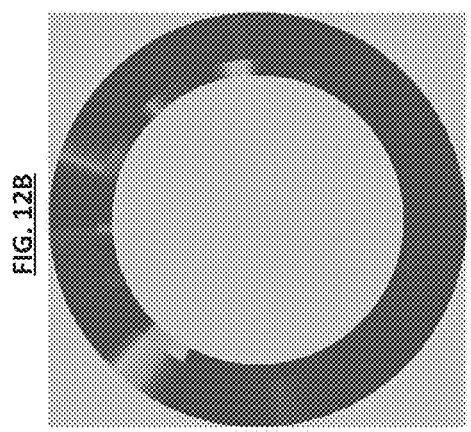
FIG. 12B
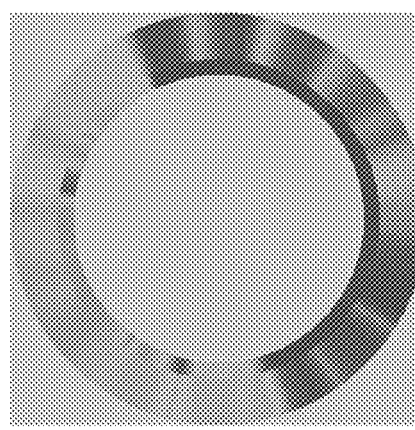
FIG. 12E
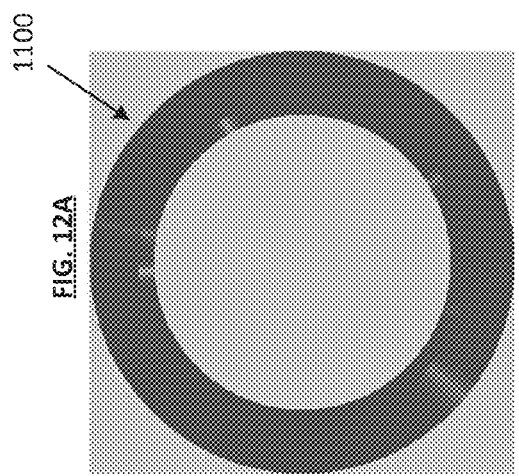
FIG. 12A
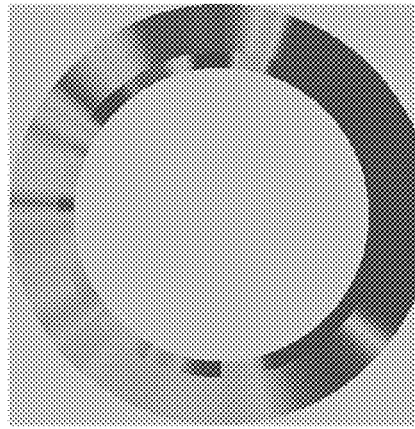
FIG. 12D

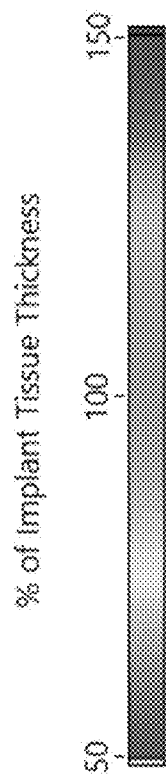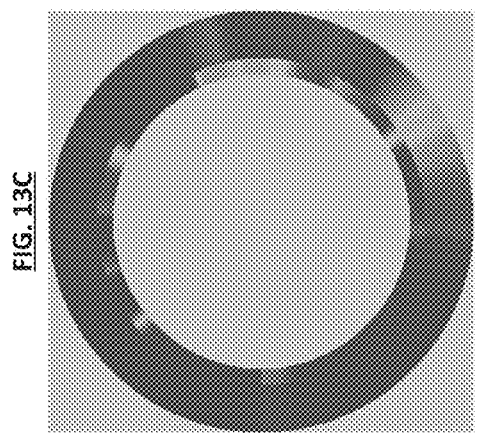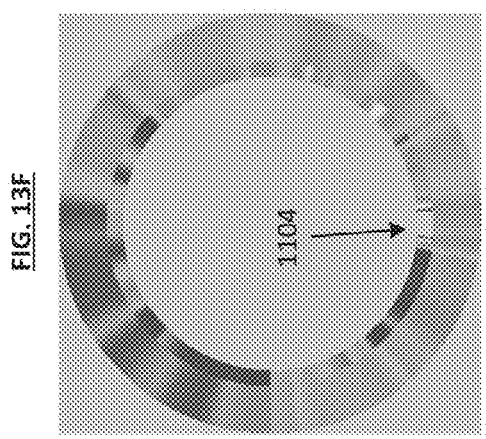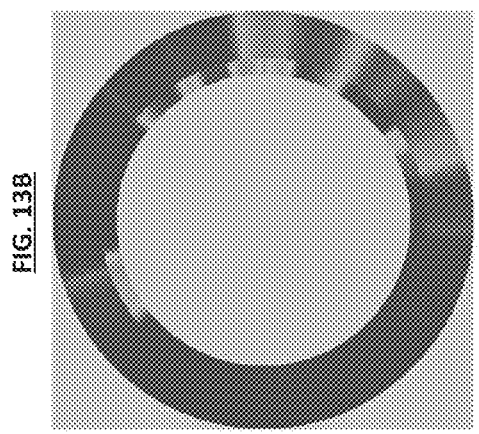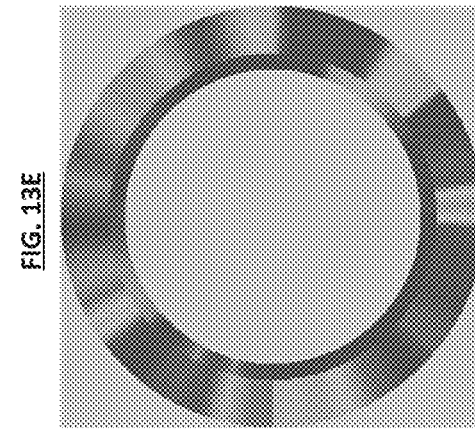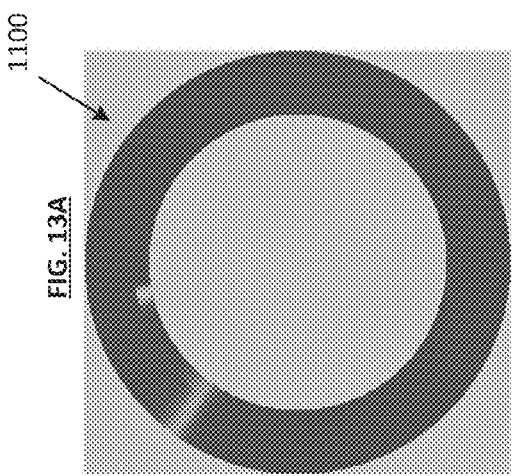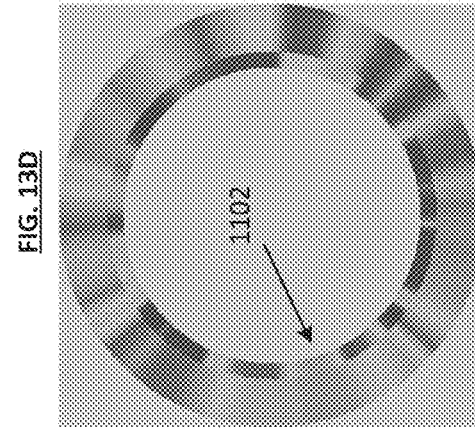

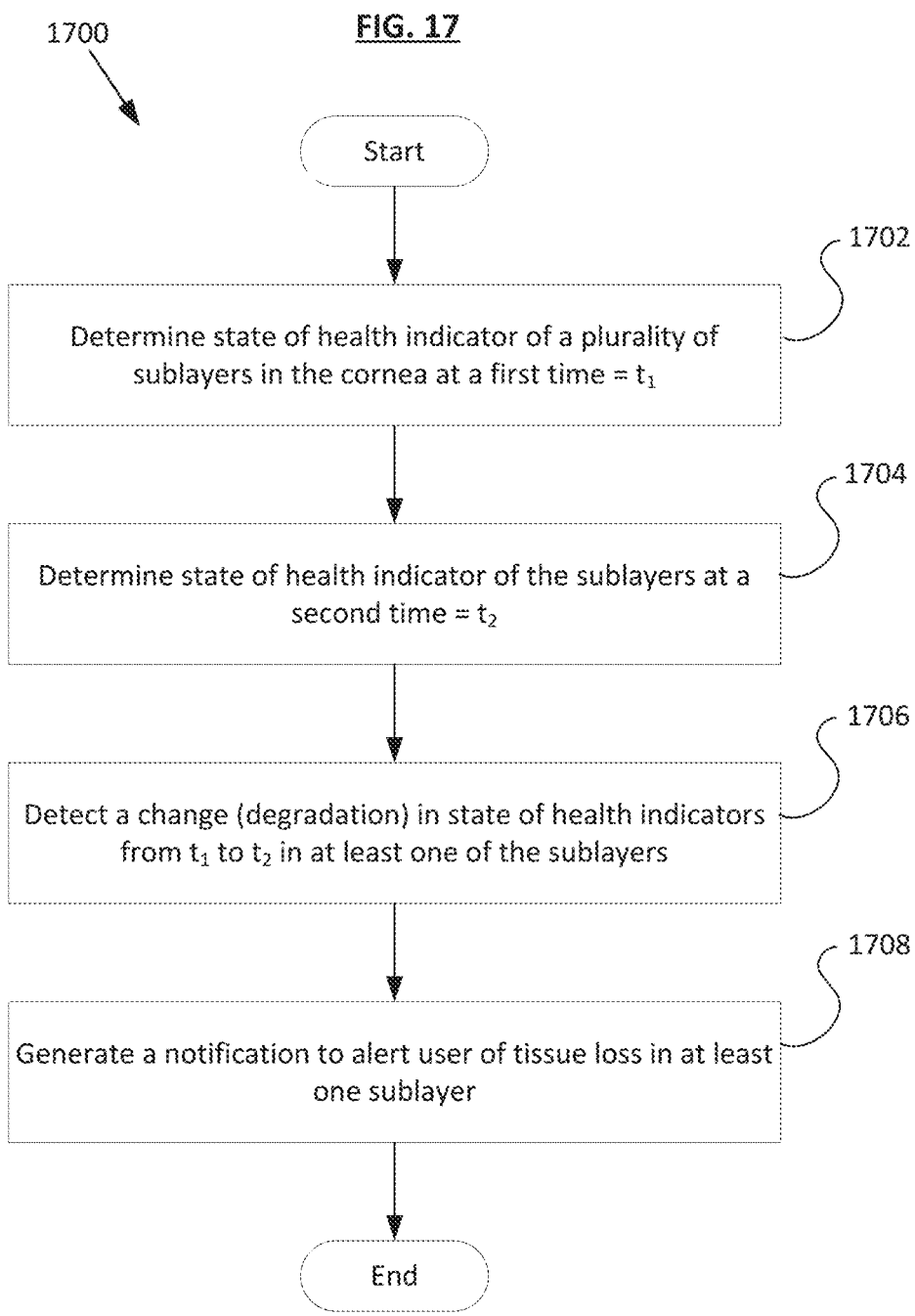

METHOD AND SYSTEM FOR MONITORING CORNEAL TISSUE HEALTH

CROSS-REFERENCE TO RELATED APPLICATIONS

This application claims priority to U.S. Provisional Application No. 63/246,219, filed Sep. 20, 2021, U.S. Provisional Application No. 63/276,221, filed Nov. 5, 2021, and U.S. Provisional Application No. 63/388,094, filed Jul. 11, 2022, each of which is hereby incorporated by reference in its entirety.

FIELD

The present disclosure relates generally to apparatuses, systems, and methods for state-of-health monitoring, such as health monitoring of the cornea of the eyes. More specifically, the disclosure relates to apparatuses, systems, and methods for generating a topographical map pertaining to the cornea.

BACKGROUND

A cornea is the clear outer layer at the front of the eye of an animal or human which helps the eye to focus light such that the animal or human can see clearly. The cornea can be susceptible to a number of corneal conditions which may prevent the eye from functioning properly. For example abrasions or scratches on the cornea may cause corneal scarring which may lead to vision problems. And, allergic reactions caused by allergens such as pollen may irritate the eye and lead to conjunctivitis. Other types of conditions include keratitis or corneal edema marked by inflammation or swelling of the cornea caused by infections or buildup of fluid in the cornea, as well as keratoconus which is a progressive corneal disease where the outer layer of eye tissue weakens and thins and pressure within the eye pushes the weakened tissue out to form a cone-like shape. This disease accelerates over time as tissue continues to thin and applied pressure within the eye forces the tissue to expand. Symptoms include vision impairment and, in more advanced cases, vision loss.

Some methods for diagnosing keratitis, corneal edema, and keratoconus use corneal topography, which characterizes the surface of the cornea like the topography of a mountain. A steep pitch indicates risk for keratoconus by identifying the signature keratoconus conical shape, and signs of swelling in the corneal topography can identify possible risk of keratitis or corneal edema. However, because such indications are generally only noticeable on a consistent basis once the diseases have progressed sufficiently, it can be difficult to identify early signs of such diseases in an individual based on a corneal topography measurement alone. Because every person's eye is different, physicians or doctors can easily overlook early signs of such diseases without additional testing or examinations.

SUMMARY

Methods, apparatuses, and systems for monitoring health of corneal tissue are disclosed. A corneal measurement device is used to measure a first state of health indicator of a region of the corneal tissue during a first period of time and a second state of health indicator of the region during a second period of time after the first period of time. A processing unit may receive the first and second state of health indicators from the corneal measurement device and automatically generate a health map of the region based on the first and second state of health indicators. The generated health map may indicate a change between the first and second state of health indicators as measured from the first period of time to the second period of time in the region of the cornea, where the state of health indicators may include one or more of: tissue opacity or tissue density.

According to one example ("Example 1"), a method of monitoring health of corneal tissue includes: measuring a first state of health indicator of a region of the corneal tissue during a first period of time such that the first state of health indicator is a first tissue opacity of the region, measuring a second state of health indicator of the region during a second period of time after the first period of time such that the second state of health indicator is a second tissue opacity of the region, and generating a health map of the region based on the first and second state of health indicators, the health map indicative of a change between the first and second state of health indicators as measured from the first period of time to the second period of time in the region of the cornea.

According to one example ("Example 2") further to Example 1, the first and second state of health indicators are measured by obtaining cross-sectional images of the region of the corneal tissue at the first and second periods of time.

According to one example ("Example 3") further to Example 2, the cross-sectional images of the region of the corneal tissue at the first and second periods of time includes (a) a first set of cross-sectional images of the region taken at the first period of time and (b) a second set of cross-sectional images of the region taken at the second period of time. The method further includes comparing the first set of cross-sectional images with the second set of cross-sectional images to generate the health map.

According to one example ("Example 4") further to any preceding Example, the region includes at least one sublayer of the corneal tissue that is being monitored, and the first state of health indicator and the second state of health indicator are associated with the at least one sublayer.

According to one example ("Example 5") further to Example 4, the at least one sublayer comprises one or more of: an external sublayer, internal sublayer, or an intermediate sublayer disposed between the external and internal sublayers.

According to one example ("Example 6") further to any preceding Example, the method includes calculating, based on the health map of the region of the cornea, a rate of change between the first and second state of health indicators from the first period of time to the second period of time.

According to one example ("Example 7") further to Example 6, the method further includes determining, based on the second state of health indicator and the rate of change of the region, a predicted state of health indicator of the region during a third period of time after the second period of time.

According to one example ("Example 8") further to any preceding Example, the method further includes measuring one or more intermediate state of health indicators of the region at one or more times between the first and second periods of time, wherein the health map is indicative of consecutive changes among the intermediate state of health indicators.

According to one example ("Example 9") further to Example 8, the method further includes outputting the consecutive changes among the first state of health indicator, the second state of health indicator, and the intermediate state of health indicator as a graph with respect to time.

According to one example ("Example 10") further to any preceding Example, the method further includes locating, on the health map, at least one subregion within the region of the cornea exhibiting a change in the first and second state of health indicators exceeding a threshold range, and displaying, on a user interface, the at least one subregion superimposed on the health map.

According to one example ("Example 11") further to any one of Examples 1-9, the method further includes determining, based on the health map and the change between the first and second state of health indicators, a diagnosis of the region of the corneal tissue, the diagnosis selectable from a list of corneal diseases stored in a memory unit, and displaying, on a user interface, the diagnosis and the health map.

According to one example ("Example 12") further to any one of Examples 1-9, displaying, on a user interface, the health map of the region as a user-interactive map, the user interface configured to receive user input and display additional information corresponding to the received user input.

According to one example ("Example 13") further to any preceding Example, the health map is a topographic map of the region.

According to one example ("Example 14") further to Example 1, the method further includes: calculating a percentage change between the first state of health indicator of the region and the second state of health indicator of the region, wherein the first state of health indicator is associated with the first period of time before a corneal implant is implanted, and the second tissue state of health indicator is associated with the second period of time after the corneal implant is implanted; determining that the percentage change is below a predetermined threshold; and displaying, on a user interface, a notification that the region of the cornea is experiencing tissue loss after the corneal implant.

According to one example ("Example 15"), a corneal tissue health monitoring system includes a corneal measurement device configured to measure a first state of health indicator of a region of the corneal tissue during a first period of time and a second state of health indicator of the region during a second period of time after the first period of time, wherein the first state of health indicator is a first tissue density of the region, and the second state of health indicator is a second tissue density of the region, and a processing unit configured to receive the first and second state of health indicators from the corneal measurement device and generate a health map of the region based on the first and second state of health indicators, the health map indicative of a change between the first and second state of health indicators as measured from the first period of time to the second period of time in the region of the cornea.

According to one example ("Example 16") further to Example 15, the first and second state of health indicators are measured by obtaining cross-sectional images of the region of the corneal tissue at the first and second periods of time.

According to one example ("Example 17") further to Example 16, the cross-sectional images of the region of the corneal tissue at the first and second periods of time include (a) a first set of cross-sectional images of the region taken at the first period of time and (b) a second set of cross-sectional images of the region taken at the second period of time. The processing unit compares the first set of cross-sectional images to the second set of cross-sectional images to generate the health map.

According to one example ("Example 18") further to any one of Examples 15-17, the region includes at least one sublayer of the corneal tissue that is being monitored, and the first state of health indicator and the second state of health indicator are associated with the at least one sublayer.

According to one example ("Example 19") further to Example 18, the at least one sublayer comprises one or more of: an external sublayer, internal sublayer, or an intermediate sublayer disposed between the external and internal sublayers.

According to one example ("Example 20") further to any one of Examples 15-19, the processing unit is further configured to calculate, based on the health map of the region, a rate of change between the first and second state of health indicators from the first period of time to the second period of time.

According to one example ("Example 21") further to Example 20, the processing unit is further configured to determine, based on the second state of health indicator and the rate of change of the region, a predicted state of health indicator of the region during a third period of time after the second period of time.

According to one example ("Example 22") further to any one of Examples 15-21, the corneal measurement device is further configured to measure one or more intermediate state of health indicators of the region between the first and second periods of time, wherein the health map is indicative of consecutive changes among the intermediate state of health indicators.

According to one example ("Example 23") further to Example 22, the processing unit is further configured to output the consecutive changes among the first state of health indicator, the second state of health indicator, and the intermediate state of health indicators as a graph with respect to time.

According to one example ("Example 24") further to any one of Examples 15-23, the processing unit is further configured to locate, on the health map, at least one subregion within the region of the cornea exhibiting a change in the first and second state of health indicators exceeding a threshold range, and the corneal tissue health monitoring system further includes a user interface configured to display the at least one subregion superimposed on the health map.

According to one example ("Example 25") further to any one of Examples 15-24, the corneal tissue health monitoring system includes a memory unit configured to store a list of corneal diseases. The processing unit is further configured to determine, based on the health map and the change between the first and second state of health indicators, a diagnosis on the region of the corneal tissue, the diagnosis selectable from the list of corneal diseases stored in the memory unit. The corneal tissue health monitoring system further includes a user interface configured to display the diagnosis and the health map.

According to one example ("Example 26") further to Example 25, the corneal tissue health monitoring system includes a user interface configured to display the health map of the region as a user-interactive map, receive user input, and display additional information corresponding to the received user input.

According to one example ("Example 27") further to Example 26, the user interface is further configured to open a new window displaying the additional information in response to detecting the user input, wherein the additional information is a user-selected cross-sectional image of the region on the user-interactive map.

According to one example ("Example 28") further to any one of Examples 15-27, the health map is a topographic map of the region.

According to one example ("Example 29") further to Example 15, the corneal tissue health monitoring system further includes a user interface. The processing unit is configured to calculate a percentage change between the first state of health indicator of the region and the second state of health indicator of the region, wherein the first state of health indicator is associated with the first period of time before a corneal implant is implanted, and the second state of health indicator is associated with the second period of time after the corneal implant is implanted; determine that the percentage change is below a predetermined threshold; and display, on the user interface, a notification that the region of the cornea is experiencing tissue loss after the corneal implant.

According to one example ("Example 30"), a corneal tissue health monitoring system includes an optical coherence tomography (OCT) apparatus configured to measure (a) a first thickness of a region of the corneal tissue during a first period of time, (b) a second thickness of the region during a second period of time after the first period of time, and (c) one or more intermediate thicknesses of the region at one or more intermediate times between the first and second periods of time. The corneal tissue health monitoring system also includes a processing unit configured to receive the first, second, and intermediate thicknesses of the region from the OCT apparatus and generate a topographic map of the region based on the first, second, and intermediate thicknesses of the region, the topographic map indicative of a time-variable change between the first and second thicknesses of the region as measured from the first period of time to the second period of time.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are included to provide a further understanding of the disclosure and are incorporated in and constitute a part of this specification, illustrate embodiments, and together with the description serve to explain the principles of the disclosure.

FIG. 2 is a schematic diagram of one of the electronic devices used in the monitoring of corneal health in accordance with an embodiment disclosed herein;

FIG. 3 is a cross-sectional view of an eye with focus on the corneal tissue and a region to be scanned by state of health measurement apparatus to be monitored by the system in accordance with an embodiment disclosed herein;

FIG. 4A is a partial cross-sectional view of an eye with focus on the corneal tissue surrounding a corneal implant as monitored by the system in accordance with an embodiment disclosed herein;

FIG. 4B is a partial cross-sectional view of an eye with focus on the corneal tissue surrounding a post-Lasik surgery region as monitored by the system in accordance with an embodiment disclosed herein;

FIG. 5 is a health map generated by the corneal health monitoring system in accordance with an embodiment disclosed herein;

FIG. 6 is an illustration of a user interface and display monitor implemented in one of the electronic devices used in the monitoring of corneal health in accordance with an embodiment disclosed herein;

FIG. 7 is a comparison graph of multiple sample data of corneal health that are monitored by the system in accordance with an embodiment disclosed herein;

FIG. 8 is a flowchart of a method of monitoring corneal health by generating the health map in accordance with an embodiment disclosed herein;

FIG. 9 is a flowchart of a method of monitoring corneal health by predicting a future state of corneal health in accordance with an embodiment disclosed herein;

FIG. 10 is a flowchart of a method of monitoring corneal health by taking a plurality of consecutive measurements of the state of health indicators to be outputted in accordance with an embodiment disclosed herein;

FIG. 11A through 11F are health maps generated by the corneal health monitoring system at different periods of time after the implantation of a corneal implant, in accordance with an embodiment disclosed herein;

FIG. 12A through 12F are health maps generated by the corneal health monitoring system at different periods of time after the implantation of a corneal implant, in accordance with an embodiment disclosed herein;

FIG. 13A through 13F are health maps generated by the corneal health monitoring system at different periods of time after the implantation of a corneal implant, in accordance with an embodiment disclosed herein;

FIG. 17 is a flowchart of a method of monitoring corneal health and detecting a loss in tissue volume after the implantation of various corneal implants, in accordance with an embodiment disclosed herein.

DETAILED DESCRIPTION

Definitions and Terminology

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

The term "thickness" of an object is used to refer to a distance measured between an outer surface and an inner surface of the object. The object may be a cornea or a portion of the cornea as explained herein.

The term "volume" of an object is used to refer to the amount of space occupied by the object or a portion of the object. The object may be a part of the cornea as explained herein, where the volume of the cornea is the total volume occupied within a measured area as viewed from a certain angle.

The term "opacity" of the cornea is used to refer to the amount or percentage of light that is observed to pass through the cornea or a portion of the cornea from one side of the cornea to the other side.

The term "density" of the cornea is used to refer to the endothelial cell density of the cornea at certain region that is measured. Corneal function may deteriorate irreversibly when the endothelial cell density falls below a critical lower threshold, and the endothelial cell density in some cases is related to the opacity of the cornea.

Description of Various Embodiments

Figure 1:
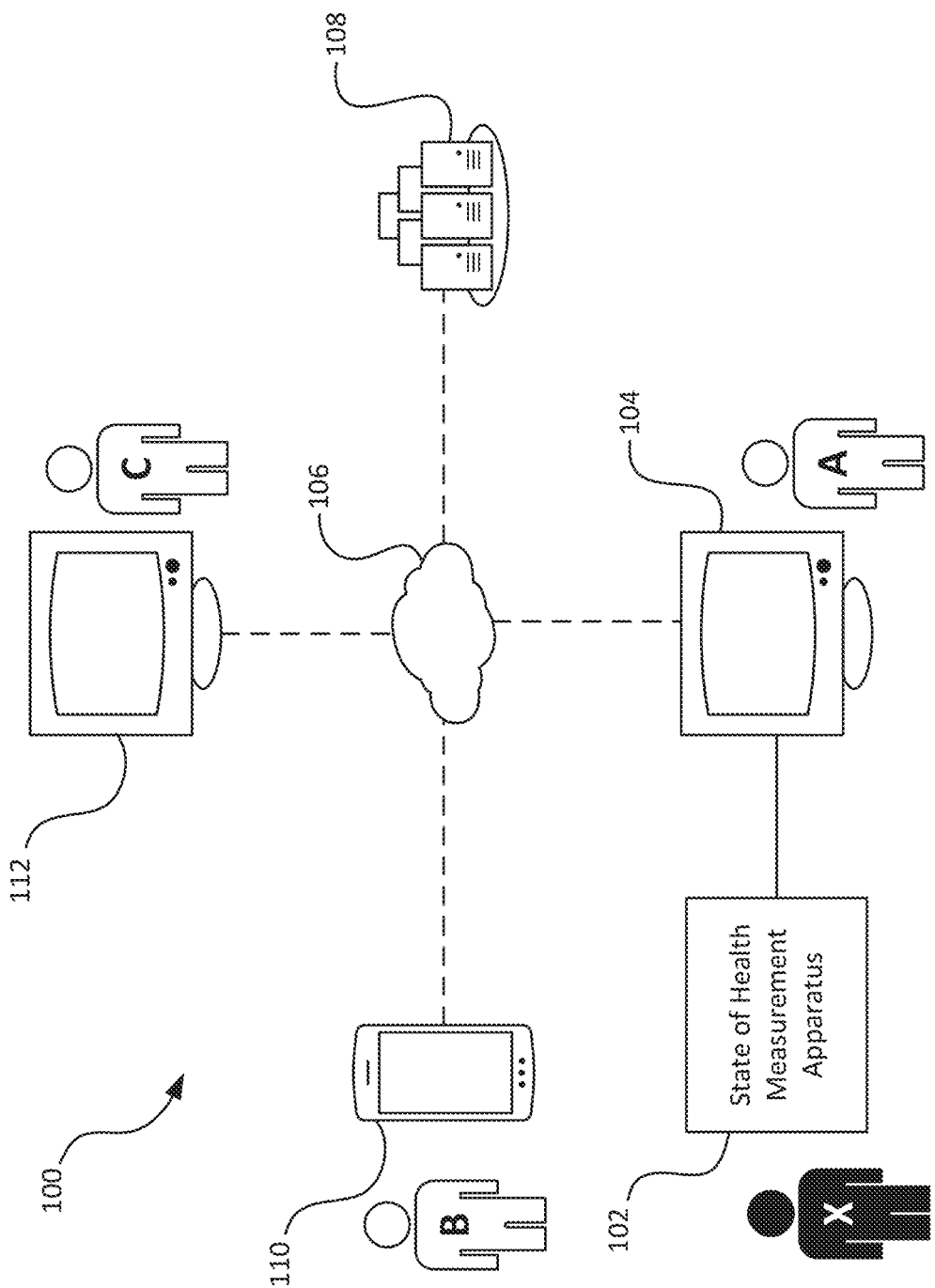
FIG. 1 is a schematic diagram of a corneal health monitoring system implementing a network of connected electronic devices in accordance with an embodiment disclosed herein.

FIG. 1 illustrates a corneal tissue health monitoring system 100, according to some embodiments. The system 100 includes a state of health measurement apparatus 102 which is used to measure the state of health of the cornea of person X, also referred to herein as a patient. The system 100 also includes a monitoring device 104 which is operatively coupled with the apparatus 102 to control and/or receive data from the apparatus 102 to be assessed or reviewed by person A, who may be the patient's doctor or physician or, as disclosed herein, may also be the patient himself or herself. The monitoring device 104 is further connected to a network 106, for example a cloud computing network or an Internet communication network, which operatively connects the monitoring device 104 with at least one of a remote server 108, a mobile device 110 accessible by another person B, or another monitoring device 112 accessible by another person C. Any one of these monitoring devices 104 and 112 or mobile devices 110 may be referred to as a user terminal. The persons B and C may be the patient, the doctor/physician, or other persons authorized to access the data regarding the corneal state of health of person X, for example the patient's family member, a specialist whom the doctor contacted to obtain a second opinion on the diagnosis, or other authorized person or entity.

In examples disclosed herein, the apparatus 102 may be any suitable device which measures any suitable indicators for the state of health of the cornea. For example, the apparatus 102 may be an optical coherence tomography (OCT) device which performs OCT imaging by using light to take a picture of the eye, in a similar manner to ultrasound harnessing sound to create images. OCT imaging creates image "slices" of the eye, in a 360 degree sweep of the eye with a centerline aligned to the pupil. The tissue area for each slice is combined to create thickness or volume measurements which the physician may compare from each of the patient's visits to monitor the tissue volume over time. It is contemplated that this rate of tissue thinning is an important factor in diagnosing keratoconus and establishing treatment. Alternatively, in other examples, the apparatus 102 may be any suitable confocal imaging apparatus, laser scanning microscopy apparatus, or pachymetry measurement apparatus, for example, capable of providing the data suitable for analysis as further explained herein.

In the system 100, the data obtained using the apparatus 102 may be analyzed using one or more of the monitoring device 104, the server 108, the mobile device 110, or the additional monitoring device 112, each of which may include at least one processing unit capable of performing data processing and analysis of the obtained data.

FIG. 2 illustrates a monitoring device 104 which is capable of performing such data processing and analysis, according to some embodiments. The device 104 includes a processing unit 200 coupled with a memory unit 202, a display and/or user interface 204, an input module or receiver 206, and an output module or transmitter 208. The processing unit 200 includes a measurement apparatus control unit 210 and an image generating or processing unit 212. The input module 206 and the output module 208 may be connected to the measurement apparatus 102 as well as the network 106 through which the data analysis may be distributed and other information may be stored and/or communicated.

The apparatus 102 is controlled by the user through use of the user interface 204 and the control unit 210. Specifically, the user may input instructions for performing the corneal tissue health monitoring, which is received by the control unit 210 and subsequently transformed into appropriate control signals to be outputted, via the output module 208, to the apparatus 102 to operate the apparatus 102. In return, the input module 206 receives the data generated by the apparatus 102 and the data is processed using the image generating or processing unit 212, after which the resulting image may be displayed for the user to review at the user interface 204. The user interface 204 may include a display device such as a display monitor or a touchscreen which operates as both the user interface and the display.

The user may use the apparatus 102 to take measurements of state of health indicators of the cornea of person X over a span of time such that the apparatus 102 obtains the state of health indicators indicative of different periods of time, such as over a plurality of days, weeks, or months, for example. Accordingly, each measurement of the state of health indicators is timestamped with the day, and in some examples also the specific time, on which the measurement was taken. In some examples, the apparatus 102 is not located in the physician's office but at the home of the person X such that the person can take frequent measurements of his or her cornea from the comfort of his or her home or other location. The results of the analysis of the measurements may then be sent from the monitoring device 104, which in this case may be the personal computer of the person X (e.g., PDA, desktop, laptop, tablet, or other device), to the remotely-located monitoring device 112 in the physician's office, where the physician or person C can review the results without having to visit the home of the person X or having the person X visit the physician's office, or otherwise be proximate the monitoring device 104. In some examples, person A may be the same as person X.

The memory unit 202, which may be any suitable type of non-transitory computer-readable medium such as random access memory, read-only memory, flash memory, or other medium, may store the data generated by the apparatus 102. The memory unit 202 may also store program codes which, when run by the processing unit 200, causes the image generating or processing unit 212 to generate a health map based on the data stored in the memory unit 202. The health map is indicative of the change in the state of health indicators from a first period of time to a second period of time following the first period of time, where the change pertains to the same region or area of the cornea that was measured. As such, the health map requires at least two measurements of the same region or area of the cornea during at least two different periods of time in order to effectively show the change between the at least two state of health indicators measured during those different periods of time. For the avoidance of doubt, the phrase "same region or area" as used herein is meant to indicate a substantial overlap in the sample regions for which data is acquired, but is not meant to require absolute overlap of sample regions.

In some examples, the analysis is performed using artificial intelligence (AI), or more specifically, machine learning infrastructure such as artificial neural network (ANN), among others, to train and operate an AI-powered segmentation model, where the model segments the relevant portions of the image of the eye and determines which portions to focus when taking the measurements. For example, proprietary calculations may be used to determine the area to be covered, which is then delivered online through a web application, for example, developed for such purposes. The web application may be installed and operated on any suitable electronic device capable of performing the AI-powered analysis. The AI-powered segmentation model may be trained using a set of scanned images, such as OCT scans and thickness/volume measurements until the algorithm learns how to segment the relevant portions automatically. The algorithm is then subsequently used on new sets of images, such as OCT image data, to output the tissue thickness/volume measurements therefrom in an automated tissue thickness/volume estimation.

In some examples implementing AI-powered analysis, the machine learning infrastructure may facilitate diagnosis of the corneal tissue based on the OCT image data. For example, based on previously provided OCT image data, the algorithm of the machine learning model may be trained to recognize patterns in the training data with respect to the conditions of the corneal tissue, such as high-risk regions of the cornea for keratoconus or corneal edema, for example. The algorithm may implement feedback loops to capture how users (for examples, physicians reviewing the AI-generated results and diagnoses) react to or engage with the output of the model. If the users notice errors in the machine-generated diagnoses, the feedback loop facilitates correction of such errors in future iterations of the model as part of the optimization process to improve the accuracy of the machine learning model. As such, in some examples, the machine learning model may replace the reviewer, e.g. the physician or person A, to generate diagnostic results. In some examples, the machine learning model may further output suggested treatment plans based on the diagnoses, for example by sending a notification to the user or outputting instructions regarding a treatment plan to be implemented by an automated treatment device for the cornea.

FIG. 3 shows an example of a region 300 of the eye which is targeted by the AI-powered segmentation model, according to embodiments disclosed herein. The region 300 is defined by a predetermined distance, for example between approximately 0.25 mm and 1 mm, from a center of the iris, or more specifically, from a center of the pupil, such that cross-sectional images of the eye (or at least a portion thereof) are taken 360 degrees with respect to a centerline defined by the center of the pupil and the center of the cornea. The distance may increase or decrease depending on the specific region of the cornea that is to be monitored. If the entire cornea is to be monitored, as shown in FIG. 3, the distance is adjusted accordingly to at least cover the distance between where the cornea protrudes forward with respect to the iris.

FIG. 4A shows another example of the region 300 of the eye which is targeted for segmentation. In this example, the purpose of monitoring the cornea is to determine any abnormalities in the cornea resulting from installing a corneal implant 400 into the cornea. The implant 400 may be installed such that an incision is made in the corneal tissue to form a "pocket" into which a portion of the implant 400 is inserted to hold the implant in place. The tissue surrounding the implant, that is, a support portion 402 (also referred to as anterior tissue) of the cornea, is of the greatest interest in this case. Contacting portions 404, as marked by the circles, between the support portion 402 of the cornea and the implant 400 are also monitored. The support portion 402 is defined by a support width "$W_{support}$" and a support thickness "$T_{support}$", and the support width $W_{support}$ determines the minimal distance for the monitoring region 300, and the support thickness $T_{support}$ is to be monitored using the measurement apparatus 102. The volume of the tissue of the support portion 402 can be calculated based on the support width $W_{support}$ and support thickness $T_{support}$ as measured. The support thickness $T_{support}$ may be between approximately 0.1 mm and 0.5 mm, for example, depending on whether there is any tissue weakening or inflammation present, for example. The support width $W_{support}$ may be between approximately 0.5 mm and 1.5 mm, for example, depending on the range that the physician decides to monitor with respect to the corneal tissue surrounding the implant. It is to be understood that any other suitable range for the support widths and thicknesses may be implemented.

The implant 400 may be positioned with respect to an outer surface 406 and an inner surface 408 of the cornea such that the external surfaces of the implant 400 is relatively flush with the outer surface 406 and the inner surface 408 of the cornea. The implant 400 may be any suitable implantable metastable device for the cornea such that the material is capable of biointegration or biocompatibility and causes low inflammation in the corneal tissue surrounding it, as well as facilitating good epithelia health in the tissue to prevent infections. In some examples, the implant is made of a biocompatible material including but not limited to a fluoropolymer, such as a polytetrafluoroethylene (PTFE) polymer or an expanded polytetrafluoroethylene (ePTFE) polymer. In some examples, the biocompatible material used in the implant may include, but not limited to, polyethylene and expanded polyethylene.

In some instances, additional components such as sutures, which may be formed of materials such as, but not limited to, polyester, silicone, urethane, polyethylene terephthalate, another biocompatible polymer, or combinations thereof. In some instances, bioresorbable or bioabsorbable materials may be used for the implant and/or the sutures, for example a bioresorbable or bioabsorbable polymer. In some instances, the sutures can include Dacron, polyolefins, carboxy methylcellulose fabrics, polyurethanes, or other woven, non-woven, or film elastomers. A monitoring device such as those previously described may be used to as a diagnostic aid to diagnose the corneal tissue condition after the implant is installed and/or to track tissue health around the implant over time, such as for the duration of the life of the implant.

FIG. 4B shows another example of the region 300 of the eye which is targeted for segmentation. In this example, the purpose of monitoring the cornea is to determine any abnormalities in the cornea resulting from a Lasik operation performed in the cornea, as shown by an incision mark 410 extending from the outer surface 406 of the cornea toward the inner surface 408. The region 300, therefore, may be of sufficient size to monitor the corneal tissue condition before, during, and after the Lasik operation and within the area most likely affected by the operation.

FIG. 5 shows a corneal tissue data map 500, according to some embodiments. The corneal tissue data map 500 may be a health map showing the change in tissue thickness of the cornea as a function of time, thereby allowing physicians to monitor the corneal health of the person X over a span of time and determine if any abnormality is observed or, in the case of post-surgery or post-operation monitoring, determine the progress and efficacy of the therapy. As shown, the data map 500 has a diameter "D" related to the predetermined distance of the region 300 and a center "C" positioned at the center of the pupil (or elsewhere on the cornea if the physician may thus prefer). The data map 500 may be a topographic map of the region of the corneal tissue that is monitored.

The data map 500 includes a legend which defines the percentage change that is observed in the corneal tissue thickness from the first measurement to the second measurement, where the two measurements are taken apart by a specified span of time, such as one month, for example. The data map in some examples may be color-coded such that each color represents different percentage value, for example red being 50% of the tissue thickness (i.e. the tissue thickness decreased, or thinned) and blue being 150% of the tissue thickness (i.e. the tissue thickness increased, or swelled) between the two measurements, and other intermediary colors such as orange, yellow, and green defining different values therebetween.

In the black-and-white data map 500 as shown, according to some examples, a cross-hatched region (506) defines a region of the most tissue thickness increase, that is, at least approximately 130% of the original thickness. A region with diagonal hatching lines from the lower left to the upper right (508) defines a region with lesser tissue thickness increase, that is, between approximately 110% and 130% of the original thickness. A white region (510) defines a region with the least increase or decrease in tissue thickness, that is, between approximately 90% and 110% of the original thickness. A region with diagonal hatching lines from the upper left to the lower right (512) defines a region with greater tissue thickness decrease, that is, between approximately 70% and 90% of the original thickness. A darker shaded region (514) defines a region with the greatest tissue thickness decrease, that is, no greater than approximately 70% of the original thickness.

In the example shown, it can be observed that one subregion 502 includes portions which experienced a greater percentage increase in tissue thickness. For example, as shown the final tissue thickness is approximately 130% to 150% of the initial tissue thickness, as compared to another subregion 504 having a thickness that may have remained relatively the same (approximately 100%) or decreased to approximately 80% of the initial thickness in some portions (as observed by the region of diagonal hatching lines from upper left to the lower right) or even to approximately 50% of the initial thickness (as observed by the darker shaded region).

In some examples, the image generating or processing unit 212 is capable of analyzing the generated image, or the data map 500, to determine the portions or subregions within the data map that is at higher risk of developing a corneal disease. For example, the processing unit 212 may flag on the data map 500 each of the subregions where the percentage change is above an upper threshold ("thick points") or below a lower threshold ("thin points"). That is, if a subregion increased in thickness to greater than a threshold value, such as approximately 130%, 140%, or 150%, or any other value therebetween, for example, compared to the initial thickness, the processing unit 212 may determine that the subregion has one or more thick points and is at an increased risk of developing keratitis or corneal edema. If a subregion decreases in thickness to less than a threshold value, such as approximately 70%, 60%, or 50%, or any other value therebetween, for example, compared to the initial thickness, the processing unit 212 may determine that the subregion has one or more thin points and is at an increased risk of keratoconus.

The processing unit 212 may then display the high-risk subregion(s) on the data map 500 on the user interface, or superimpose one or more markers on the data map 500 to show such subregion(s). In some examples, the processing unit 212 may also provide a diagnosis of the corneal tissue based on the analysis of the data map 500, in which case the processing unit 212 may select the diagnosis from a list of corneal diseases that is stored in the memory unit and display the selected diagnosis for the user's review.

FIG. 6 illustrates an exemplary monitoring device 104 which includes a display 204A (that is, a display monitor) and a user interface 204B (that is, a keyboard) separately, as well as the processing unit 200. The keyboard 204B allows the user to interact with the data map 500, which in this case is a user-interactive map, that is shown on the display monitor 204A. Using the keyboard 204B, the user is capable of selecting a subregion 602 within the data map 500, in response to which the processing unit 200 causes the display monitor 204A to show or display additional information 600 which may be superimposed on the data map 500 or shown in a new popup window placed on or near the data map 500. The additional information 600 may be any suitable information pertaining to the user-selected subregion 602, for example the original cross-sectional image of the region of the corneal tissue generated by the apparatus 102, a graph showing the change in the thickness of the subregion as a function of time, a possible diagnosis generated by the system 100 as mentioned herein, etc. The additional information 600 may be stored in the memory unit 202 until the processing unit 200, or more specifically the image generating or processing unit 212, determines to display the information for the user's review.

In some examples, the data map 500 may also include a time adjustment feature 604, such as a scrollbar or pulldown menu, or any other suitable user input feature, for the user to adjust the period of time which is of interest for the user. For example, the data map 500 in FIG. 6 shows the changes in the thickness of the corneal tissue from the first thickness measured at time $t_0$ to a second thickness measured at time $t_3$, but the user may use the time adjustment feature 604 such that instead of time $t_3$, time $t_2$ or time $t_1$ may be selected, in which case a different data map is displayed such that the changes in the thickness of the corneal tissue are shown from $t_0$ to either of $t_2$ or whichever is selected. The state of health indicator, such as tissue thickness or volume, etc., measured at time to is considered the baseline indicator from which the changes are calculated, which may be the earliest measurement taken by the person X or a time selected by the physician for the start of monitoring the corneal health of the person X, for example.

FIG. 7 shows a comparison graph 700 of six (6) separately collected sample data, which may be displayed on the display monitor 204A as the additional information 600 in response to user input. In some examples, the system 100 may operatively connect a plurality of state of health measurement apparatuses 102 with the network 106 such that a physician may access any one or more of the data obtained from the plurality of apparatuses 102 from his or her monitoring device 104, 110, or 112 to compare the changes in tissue volume (e.g., measured in $mm^3$) over a span of time, where each clock hour may be a day, a week, or a month or some other period of time apart from the previous or subsequent clock hour. In some examples, the data value between each consecutive measurement may be interpolated to show continuous changes in each sample data from the first sample taken at when clock hour is 1 to the last sample taken at when the clock hour is 12. The interpolation may be linear interpolation, as shown, where consecutive data points are connected using a line. In some examples, other forms of interpolation may be performed, such as spline interpolation or polynomial interpolation, etc.

FIG. 8 shows an exemplary method 800 used by the system 100 to obtain the health map for displaying to the user. In step 802, a first state of health indicator of a region of the corneal tissue is measured during a first period of time. In step 804, a second state of health indicator of the same region of the corneal tissue is measured during a second period of time. In step 806, the health map of the region is generated, where the health map indicates a change from the first state of health indicator to the second state of health indicator. As disclosed herein, the generation of the health map may be performed using any suitable algorithm including, but is not limited to, the AI-powered segmentation model which creates a topographical map of the region of the corneal tissue by comparing the differences between the first and second state of health indicators as a function of time. In step 808, the health map is displayed on a user terminal, such as the display monitor of the user's monitoring device or mobile device.

FIG. 9 shows an exemplary method 900 used by the system 100 to utilize the measured information regarding state of health to provide a prediction regarding the state of health of the cornea. In step 902, following step 806 of method 800, the system 100 calculates a rate of change from the first state of health indicator to the second state of health indicator. Based on this rate of change, the system 100 calculates a predicted state of health indicator of the same region of the corneal tissue during a third period of time which is after both the first and the second periods of time when the measurements were taken. As such, the system 100 can predict a future state of health indicator measurement by calculating the rate of change obtained from past measurements. This prediction can be displayed as the additional information 600 for the user, who may be a physician, for example, to better understand the severity of the disease.

FIG. 10 shows an exemplary method 1000 used by the system 100 to perform more than two measurements for the health map generation, and how the additional measurement information can be utilized. In step 1002 following step 802 where the first state of health indicator is measured, one or more intermediate state of health indicators may be measured in the same region between the first period of time and the second period of time. Subsequently, the second state of health indicator is measured in step 804 following step 1002, in which the second state of health indicator is also referred to as the final state of health indicator because it is the final indicator to be measured in the sequence of indicators beginning with the first indicator in step 802. The sequence of data pertaining the indicators, therefore, can indicate the progression of any corneal tissue disease, and in some examples, also visually mark the areas that are being affected or likely to be affected, to be reviewed by the physician.

After the health map is generated in step 806 based on the first and final state of health indicators, in step 1004, the consecutive changes among the first, intermediate, and final (or second) state of health indicators are outputted as a graph with respect to time. That is, each measurement of the state of health indicators is plotted in the graph to show a time-variable representation of how the state of health indicator fluctuates from one period of time to another.

It is to be understood that, with regard to the steps in methods 800, 900, and 1000, the state of health indicators may be any one of: tissue thickness, tissue volume, or tissue opacity (or density) of the region of the cornea that is measured, another indicator, or combinations of any of the foregoing indicators. In some examples, the state of health indicators are measured by obtaining cross-sectional images of the region of the corneal tissue at the different periods of time. The cross-sectional images may include a first set of cross-sectional images of the region of the corneal tissue taken at a first period of time and a second set of cross-sectional images of the same region taken at a second period of time following the first period of time, after which the first set and the second set are compared against each other to determine the change from the first set to the second set and subsequently generate the health map.

In some examples, the analysis and/or diagnosis may be performed using a single set of state of health indicator measurements taken at a single period of time. That is, instead of comparing two sets of cross-sectional images, the system may be capable of determining the thick points and thin points solely from a single set of cross-sectional images. For example, if the corneal tissue thickness is beyond a typical range of thickness that would be considered healthy, the system may alert the physician, instantaneously or near-instantaneously, to inform that there may be a problem with the corneal tissue of the person X. The system may further provide the diagnosis based on the single set of cross-sectional images or take subsequent measurements at a later period of time to confirm if the risk of disease is still present.

The health map generated using any of the aforementioned methods and system may be used to diagnose, monitor, and assess efficacy of a treatment. The physician can better determine the efficacy by reviewing the resulting health map which combines the thickness or volume change in the corneal tissue with the topography imaging, which provide additional visual aid for diagnosis, without having to manually track the scanned tissue volume from each visit of the patient to the physician's office in order to compare the current tissue state with a previous tissue state provided from one or more previous scans. The automation of such health map generation also reduces the margin of error, both in the frequency and regularity of image data for review, as well as in manual calculations.

In some examples, the user or person X utilizes the at-home OCT device (that is, the apparatus 102) to image the cornea as frequently as needed, instead of having to go to the physician's office to use the OCT equipment and device. The reduction of multiple office visits could make the OCT scanning more accessible for patients, especially those with more severe symptoms of corneal diseases and therefore having limited travel capability. If the patient cannot travel frequently, the frequency of data analysis would also be reduced, so increasing accessibility to the OCT device facilitates more timely patient scan data to be generated and also faster analysis of therapy efficacy. Faster or earlier analysis of therapy efficacy or success may allow the physician to make adjustments as needed if the therapy is not deemed as successful.

Images may be analyzed using the monitoring device 104 of the person X, or alternatively be deidentified (anonymized) and sent to the cloud network 106 for analysis, in which case the server 108, for example, may perform the analysis. An algorithm run by the server 108 may import and transform the OCT images into manageable datasets and measures the corneal tissue volume over time. Each volume calculation may be compared with a baseline tissue volume to calculate changes in volume over time. The analysis may be plotted in both a topographic map and in graph form for physicians to review in a digital interface (that is, any one of the devices 104, 110, and 112). In some examples, the volume measurements are analyzed with respect to difference between the orientation angle of the cornea and the OCT coordinate system.

As known in the art, the OCT device forms the OCT images one column at a time using infrared light to penetrate the surface of the sample and reflect the infrared light from substances inside the sample. Using principles of interference, the OCT device determines from what depth a photon of the infrared light was reflected inside the sample. By measuring the depths of photon reflections, aggregating the same into an image column, and scanning the beam sideways, adjacent columns are aggregated and compiled in to a 2D image, which represents the cross-sectional image of the sample that is scanned. By aggregating and compiling multiple 2D images obtained this way, the OCT device is capable of constructing a 3D representation of the sample. Unlike scanning devices using ultrasound which can see centimeters into the tissue with millimeter resolution, the OCT device is capable of seeing a few millimeters into the tissue but with micrometer-level resolution, making the OCT a preferred method of scanning for corneal tissue abnormalities, although other known scanning methods can be utilized to produce similar results.

In some examples, the physicians will have additional confidence in analysis because the interface would enable the physicians to click on the topographic map area of focus to review the raw (or pre-analysis) OCT image data and validate algorithm analysis, as further disclosed herein. As such, this system 100 provides diagnostic tools to the physician to better inform treatment and therapy effectiveness. This improved patient monitoring allows physicians to tailor therapies, quickly understand effectiveness, adjust treatment or therapies as needed without an additional office visit, and create additional telemedicine opportunities for high-risk patients. Furthermore, because of the cloud nature of the software, a company using the system 100 can collect patient-consented data to generate insights that may inform software improvements, future product offerings, and quantitative data regarding treatment outcomes.

Health maps are representations of corneal tissue thickness and corneal tissue volume that can be generated in accordance with the techniques described above with regard to FIGS. 5-7. These health map representations of the corneal thickness or volume can be presented as color images with the colors representing different values of thickness or volume at various locations about the cornea, as shown in FIGS. 11A-11F, 12A-12F, and 13A-13F. As can be appreciated, colored health map representations can be presented in other formats, such as a black-and-white format where differing colors are alternatively represented by appropriate imagery that conveys meaning in a black-and-white image such as with the use of cross-hatching or stippling as illustrated in FIG. 5. As can also be appreciated, another format can be a numerical format where numerical thickness or volume values are presented by small numbers displayed on and about the health map image where the colors are usually displayed, thereby presenting the thickness and volume data in a manner similar to maps where ocean depth values are distributed about an image of a body of water to indicate ocean depth at various locations.

FIGS. 11A through 11F show the health maps indicating the progression of tissue inflammation or tissue loss in the region of the cornea after the implantation of a corneal implant, such as the corneal implant 400 shown in FIG. 4A. The thickness of the tissue is measured near the contacting portions (e.g., the contacting portion 404) where the corneal tissue meets the implant (such as at support portion 402), thus forming a ring with a predetermined width, as shown in the figures.

Applying a corneal implant to the cornea of a subject may result in inflammation and thickening of the tissue surrounding the implant during a certain period following the procedure. Over time, the inflammation (and tissue thickness) is expected to subside and stabilize as the implant is safely integrated into the cornea of the subject, thereby decreasing the tissue volume or thickness to return to approximately the same volume and thickness as existed before the implant was applied. However, in some cases, the corneal tissue may further decrease in tissue volume or thickness beyond the original volume or thickness, which indicates a serious medical condition for which immediate medical attention may be necessary. In such cases, the loss of corneal tissue volume or thickness may be the result of a faulty implant, or due to a medical condition of the subject that may result in permanent damage to the cornea if left untreated. Therefore, monitoring the corneal tissue volume or thickness after implantation is important in preventing or mitigating problems that may have been caused or worsened by the implantation surgery or the presence of the implant or caused by an unknown external factor, as well as assisting doctors or physicians in determining whether the implant or the unknown external factor was a factor influencing the tissue loss.

In the figures shown, FIG. 11A is the health map generated one month after implantation, FIG. 11B is the health map generated two months after implantation, FIG. 11C is the health map generated three months after implantation, FIG. 11D is the health map generated four months after implantation, FIG. 11E is the health map generated five months after implantation, and FIG. 11F is the health map generated six months after implantation. Although the health maps are generated in one-month increments, it is to be understood that any other increments, shorter or longer, may be used as suitable for the procedure. According to the legend provided, a red region indicates substantial tissue loss, at about 50% of the original tissue thickness, a green region indicates relatively small change in tissue thickness (around 100% of the original thickness), and a blue region indicates substantial tissue inflammation, at about 150% of the original tissue thickness. FIG. 11A shows a region 1100 having tissue inflammation as shown by the blue-colored area of the health map, FIG. 11B shows a region 1102 having around the same tissue thickness as the original, and FIG. 11E shows a region 1104 having tissue loss as compared to the original thickness. As used herein, the "original" thickness or volume of the corneal tissue is the thickness or volume of the corneal tissue as measured before the corneal implant is implanted, which facilitates accurate comparison between pre-implant and post-implant states-of-health for the corneal tissue.

Figure 11G:
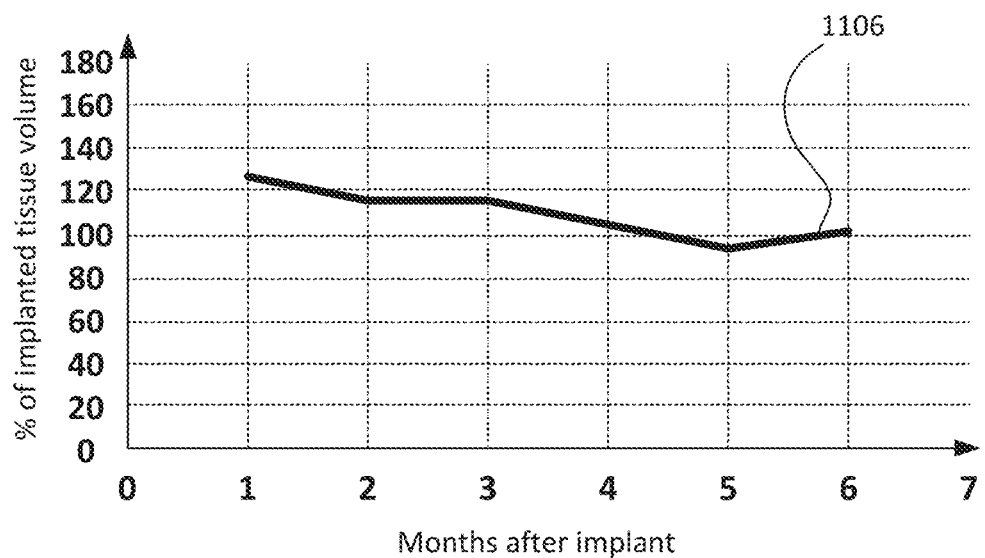
FIG. 11G is a graph showing the change in corneal tissue volume after the implantation of the corneal implant, based on FIGS. 11A through 11F.

FIG. 11G is a graph displaying average cornea volumes as a percentage based on an initial pre-surgery cornea volumes derived from the data associated with and presented in FIGS. 11A-11F and further shows total corneal tissue volumes 1106 as measured at different increments during a six-month span of time. The total tissue volume can be calculated using any suitable method. For example, the total tissue volume can be calculated by combining a sufficient number of corneal thickness measurements and the surface area of the eye over which those thickness measurement are associated, thus providing a corneal tissue volume. In another example, an average cornea thickness can be determined from the data generating from cornea health maps, exampled in FIGS. 11A-11F, and the cornea surface area related to that health map can be used to calculate an average cornea volume value. In yet another example, the total tissue volume can be calculated by measuring the tissue volume in a smaller area of the cornea, then adding all the measured volumes together to cover the entire area of the cornea. In FIG. 11A, an increment of θ degree(s) is used such that the area of the health map that is covered by the θ-degree arc is calculated, then multiplied with the average thickness measured within the area defined by the arc to generate the volume within the θ-degree arc. The arc is subsequently rotated clockwise (or counterclockwise, as suitable) until an entire "sweep" of the 360-degree range is completed. The total tissue volume as determined using this method or the other methods described above can then be compared with the total tissue volume before the implant to determine the percentage change in the total tissue volume, whose value is plotted on the graph as shown in FIG. 11G for each time increment. The value of θ may be any suitable value, including but not limited to any one of the divisors of 360 (that is, 1, 2, 3, 4, 5, 6, 8, 9, 10, 12, 15, 18, 20, 24, 30, 36, 40, 45, 60, 72, 90, 120, 180, and 360 degrees, for example). As an alternative to a degree-based system, the location of the corneal thickness measurement or the location of a feature observed in the displayed data can be based on the face of a common clock with the upmost or zero-degree position of the clock referring to a twelve-o'clock position and the remainder of the position based on well-known positions about the clock face. Similarly, the location of the corneal thickness measurement or the location of a feature observed in the displayed data can be based on well-known compass orientations with the North direction aligned with the aforementioned zero-degree or twelve-o'clock directions.

In FIG. 11E, the tissue loss is observed (as shown by the red region 1104) mainly in the nine-o'clock direction of the ring, whereas in FIG. 11F, the red region has spread to the ten-o'clock direction as well, which may indicate corneal tissue degradation when viewed locally, but as shown in FIG. 11G, the overall volume of the corneal tissue has increased from the five-month measurement (FIG. 11E) to the six-month measurement (FIG. 11F), which may indicate that the condition of the corneal tissue is improving from the five-month to the six-month measurement, indicating that the inflammation of the corneal tissue is stabilizing, and the amount of tissue loss observed is small, localized, and clinically acceptable. As such, the doctor or physician may be interested in not only whether there is tissue loss in the cornea, but also where the tissue loss is located, the regions of the eye that are affected, and how much the tissue loss would affect the health of the cornea as a whole. For this reason, it may be beneficial to not only consider the local tissue thickness measurements but also the percentage change in the total tissue volume when making decisions regarding the success or failure of the implant as a whole or when deciding with additional treatment is necessary.

Similarly, FIGS. 12A through 12F show the health maps generated during a period of one to six months after implantation, respectively, for a different subject. As used herein, "subject" may refer to any suitable patient, such as human or animal (e.g., mammal) undergoing the corneal implant treatment or any other similar cornea procedure. In these figures, there is no red region 1104 observed anywhere, thus indicating that there is low risk and low presence of corneal tissue loss after implantation. Total corneal tissue volumes 1200 of FIG. 12G as measured during the six-month span shows the gradual decrease in the total tissue volume over the six-month period of monitoring and that the tissue volume remains above 100% at all times during this period, thereby indicating that the corneal tissue is likely stabilizing and that the corneal implantation appears to be successful.

Similarly, FIGS. 13A through 13F show the health maps generated during a period of one to six months after implantation, respectively, for yet another different subject. Although there is a slight red region 1104 in FIG. 13F, overall the total corneal tissue volume has not decreased to below the original volume, as shown in total corneal tissue volumes 1300 of FIG. 13G, indicating that the corneal tissue is likely stabilizing for this subject as well.

Figure 12G:
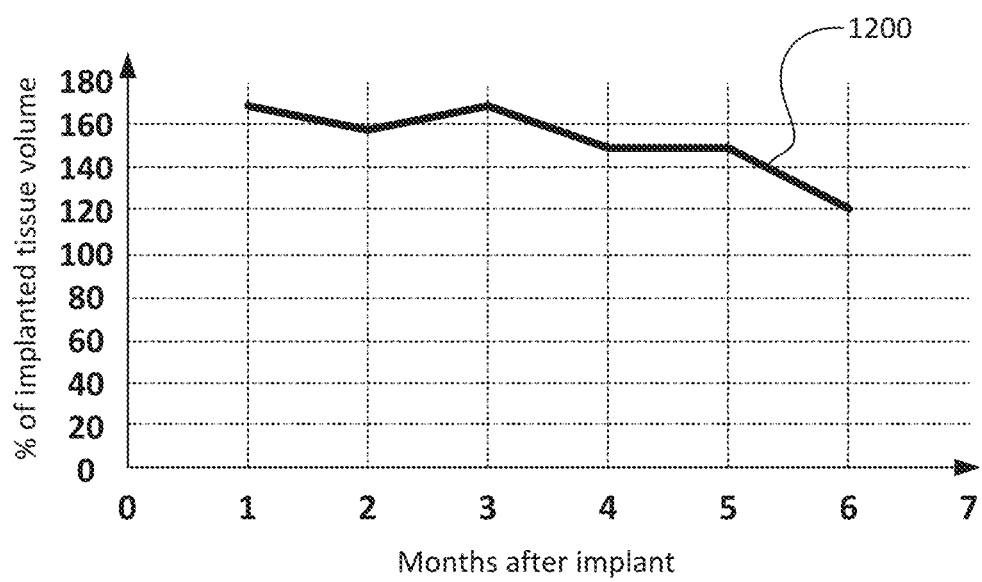
FIG. 12G is a graph showing the change in corneal tissue volume after the implantation of the corneal implant, based on FIGS. 12A through 12F.
Figure 13G:
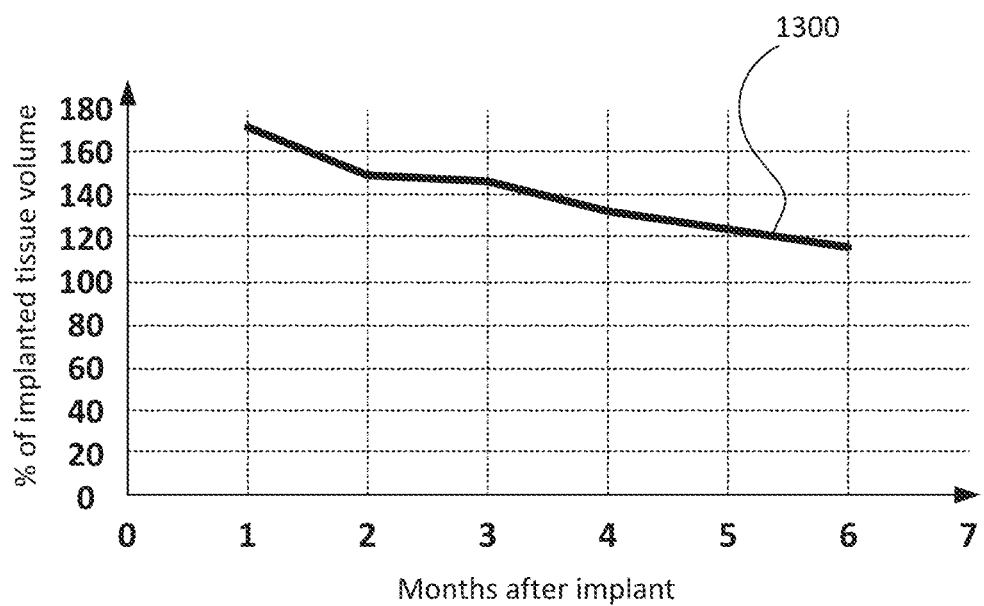
FIG. 13G is a graph showing the change in corneal tissue volume after the implantation of the corneal implant, based on FIGS. 13A through 13F.
Figure 14:
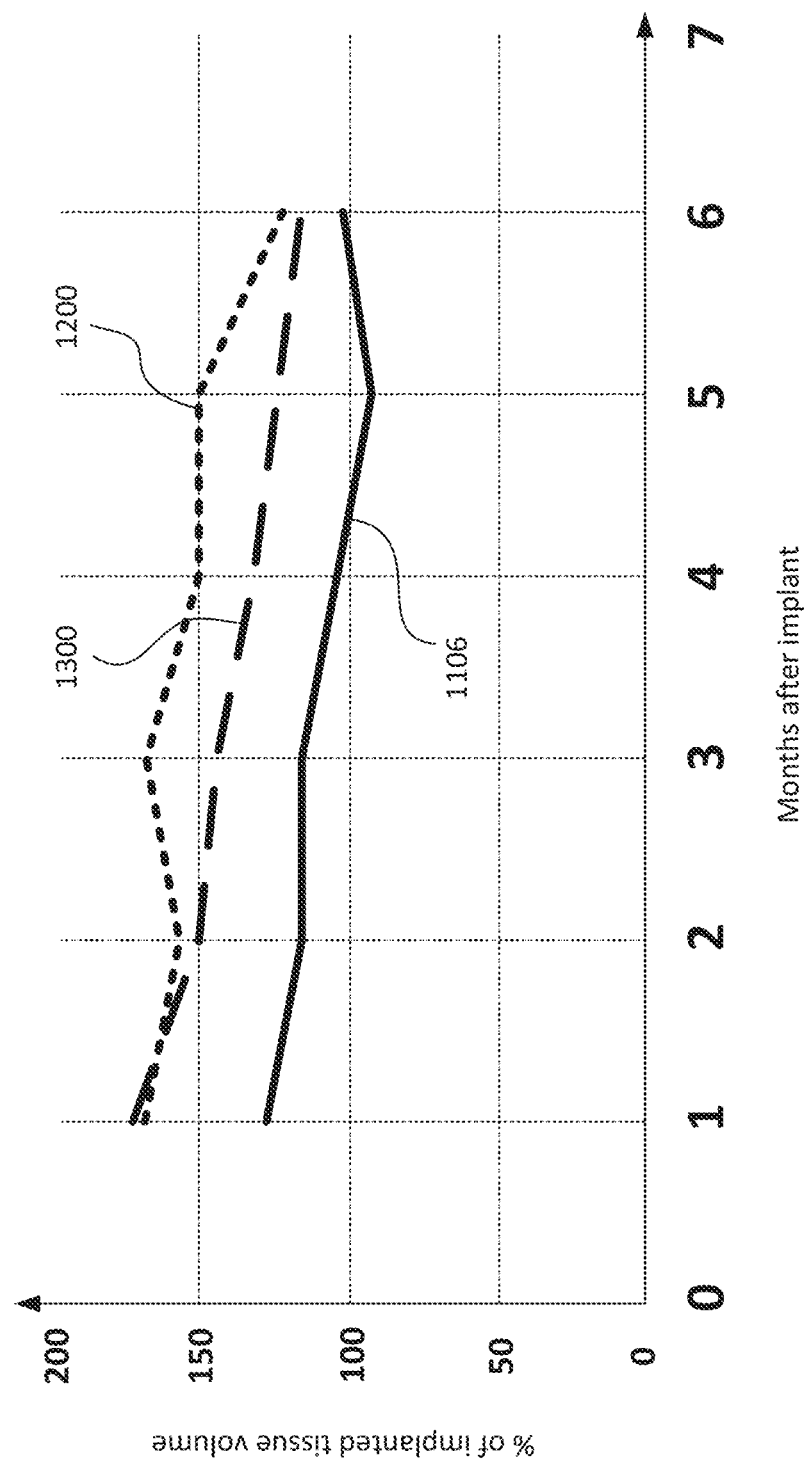
FIG. 14 is a comparison graph of the changes in corneal tissue volume from FIGS. 11G, 12G, and 13G.

FIG. 14 compares the changes in the total corneal tissue volumes 1106, 1200, and 1300 from FIGS. 11G, 12G, and 13G, respectively, as plotted on the same graph, to present the differences in the changes of total tissue volumes in the cornea of the three different subjects over the same span of time, who have been treated using the same type of corneal implant, for example. In some examples, such comparison may be performed for a plurality of subjects to determine the overall efficacy of the same corneal implant across multiple patients, to evaluate the success of the implantation procedure across multiple patients, or to the performance of comparable corneal implants that differ from each other in some respects. Any suitable method of statistical analysis as known in the art may be applied, such as the statistical average changes (or fluctuations) in corneal tissue volume over time and the standard deviation of the sample data being analyzed, to determine any pattern or trend which may be deduced based on the collected data regarding the corneal tissue volumes. Based on the determined pattern or trend, the doctors or physicians may make decisions regarding the safety and efficacy of the corneal implant that is being used.

Figure 15:
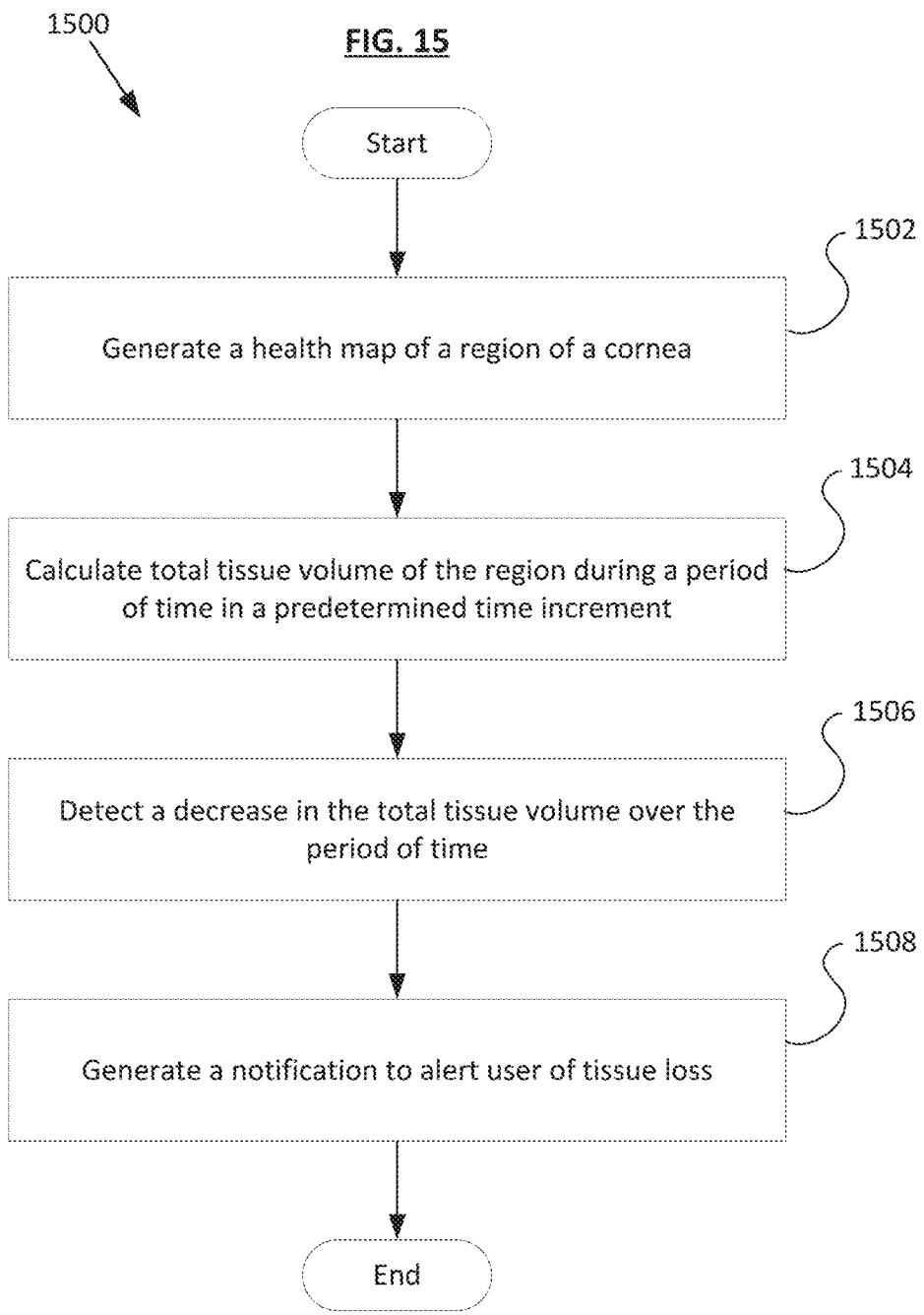
FIG. 15 is a flowchart of a method of monitoring corneal health and detecting a loss in tissue volume after the implantation of various corneal implants, in accordance with an embodiment disclosed herein.

In some examples, the health map may be generated at a consistent pace even after the initial period of time after the implantation. For example, health maps may be generated once every predetermined increment of time to continuously monitor the state of health of the subject's cornea during a healing period, as part of an ongoing check-up protocol that monitors eye health year-after-year as component of a routine heath review, or as a technique to monitor corneal health to identify patients needing corrective therapies. FIG. 15 shows an exemplary method 1500 used by the system 100 to analyze the health map to alert the user in this regard. In step 1502, a health map of a region of the subject's cornea is generated using any suitable method as disclosed herein. Using the generated health map, a total corneal tissue volume is calculated in step 1504 such that the total tissue volume of the region during a period of time is calculated and stored (for example, in a memory device) in a predetermined time increment, such that a constant record of tissue volume data is generated and stored for analysis.

In step 1506, a decrease in the total tissue volume of the period of time is detected, such as by calculating the percentage change in the total tissue volume after implantation, as compared to the original pre-implantation tissue volume. In some examples, average tissue volume may be used instead of the total tissue volume, in which case the average tissue volume may be calculated by dividing the total volume by the total area of the region or the health map. In step 1508, a notification is generated to alert the user of a tissue loss in the cornea, as suitable. In some examples, the notification is generated in response to calculating a percentage change between the first tissue volume of the measured region of the cornea and the second tissue volume of the region, where the first tissue volume is associated with before the corneal implant, and the second tissue volume is associated with after the corneal implant. When the percentage change is determined to be below a predetermined threshold, the notification may be displayed indicating that the region of the cornea is experiencing tissue loss after the corneal implant. In some examples, the notification may be generated without calculating such percentage change, but in response to the detection of any tissue loss in the cornea after the artificial corneal implantation.

Figure 16:
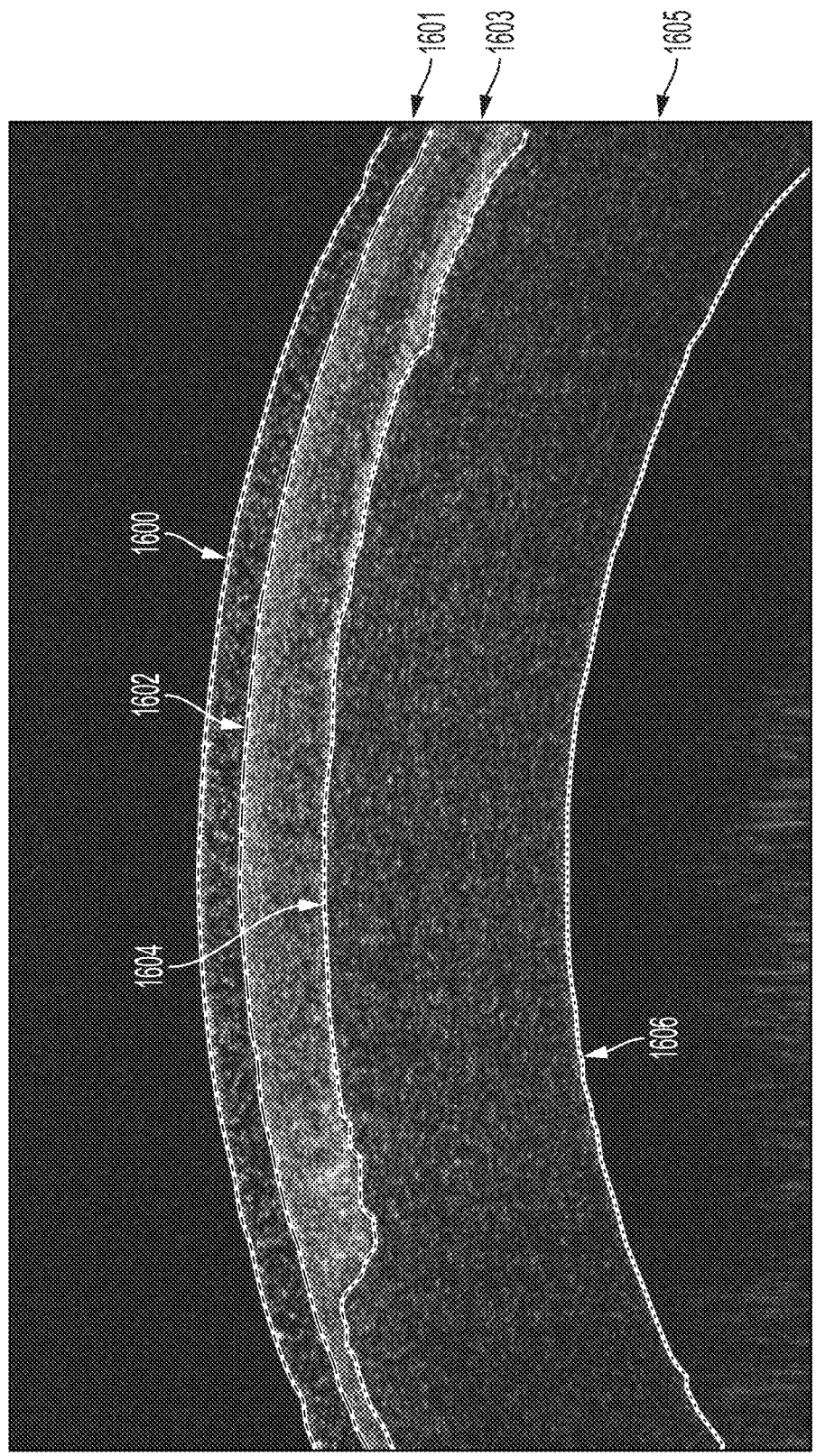
FIG. 16 is a cross-sectional image of the cornea of an eye showing sublayers which can be monitored in accordance with an embodiment disclosed herein.

FIG. 16 is a cross-sectional image of the cornea of an eye which may be obtained using any suitable method such as via optical clearance tomography, for example. The image shows sublayers which can be monitored for corneal health. As an example, the cornea can be separated into different sublayers, where each sublayer defines a portion of the total thickness of the cornea at a predefined location. For example, an external sublayer 1601 (or an outermost sublayer) may be defined as the sublayer which includes an external surface 1600 of the cornea, which is the region of the cornea that comes into direct contact with the outside air and the eyelid, and an internal sublayer 1605 (or an innermost sublayer) may be defined as the sublayer which includes the internal surface 1606 of the cornea, which is the region of the cornea that is closest to an iris (as shown in FIG. 3) of the eye. An intermediate sublayer 1603 may be defined as the sublayer which is disposed between the external sublayer 1601 and the internal sublayer 1605. In some examples, there may be a plurality of intermediate sublayers 1603 which can be monitored. In some examples, one or more of the sublayers may be monitored for corneal health determination. In some examples, the sublayers that are monitored may exclude certain sublayer(s), such that any one (or more) of the external, internal, and intermediate sublayers may be simultaneously and independently monitored.

In some examples, the sublayers are formed as a result of a procedure or surgery performed on the cornea. For example, an incision made in the corneal tissue (such as the incision mark 410 of FIG. 4B) may define the boundary between two separate sublayers, and this incision may be monitored after the procedure such that the doctors and physicians can be sure that the cornea is recovering without any problem. For example, the boundary line 1602 that separates the sublayers 1601 and 1603 as well as the boundary line 1604 that separates the sublayers 1603 and 1605 may be formed as a result of incisions made in the corneal tissue. If the state of health of the sublayer on either side of the incision indicates any tissue loss (e.g., if the thickness of the sublayer on either side of the incision is reduced over time), it would be considered an indication of a possible problem with the corneal tissue.

In view of the above, in some situations, it is important to consider the state of health of each sublayer separately and independently from the other sublayers such that any change in the state of health (which in some examples may be a change in thickness, volume, opacity, or any combination thereof) may be detected and flagged at an early stage. In some examples, the intermediate sublayer 1603 may be an implant such as the corneal implant 400 of FIG. 4A, in which case only the external sublayer 1601 and the internal sublayer 1605 are monitored, thus disregarding the implant from the state-of-health measurements. In such example, the boundary lines 1602 and 1604 define the two opposing surfaces of the corneal implant.

FIG. 17 shows an exemplary method 1700 used by the system 100 to analyze the state of health of the corneal tissue at a sublayer level as explained above with respect to FIG. 16, according to some embodiments. For example, in step 1702, the state of health indicator (e.g., thickness, volume, opacity, or any suitable combination thereof) is determined for a plurality of sublayers in the cornea at a first time $t_1$, and in step 1704, the state of health indicator is determined for the sublayers at a second time $t_2$. In step 1706, a change (e.g., indicative of a degradation in the corneal tissue) in the state of health indicators is detected between $t_1$ and $t_2$, or from $t_1$, to $t_2$. This change may be detected using any suitable method, including but not limited to performing visual analysis of the cross-sectional tomography images obtained of the corneal tissue, or comparing the coherence in beam reflectance and signal strength of the optical beams as it passes through the corneal tissue. After a change is detected, in step 1708, the notification is generated to alert the user of a tissue loss (or a possible tissue loss) in the cornea, as suitable.

Such sublayer-based analysis may be advantageous when, for example, one sublayer decreases in thickness or volume and another sublayer increases in thickness or volume such that the total thickness or volume remains relatively the same. Therefore, even if the total thickness or volume remains relatively consistent, it would be possible to detect tissue loss in a sublayer if each of the sublayers is monitored and analyzed separately and independently of one another.

If any tissue loss is detected or determined in generating the health map, or if the percentage change in the total corneal tissue volume is beyond a certain threshold (for example, below about 97%, 95%, 92%, 90%, 85%, 80%, or any other suitable value therebetween as compared with the original tissue volume which defines the 100% base value), the computing device (for example, the processor) may generate an alert or notification to the user, who may be either the subject or the doctor/physician responsible for monitoring the corneal health of the subject. If the notification is sent to the user, the notification may include a message to receive immediate medical attention. If the notification is sent to the doctor or the physician, the notification may include a detailed description regarding when and where the tissue loss may have been detected in the subject's cornea, in order to facilitate the diagnostic process.

As can be appreciated, a physician would find this data and the presentation this data helpful in diagnosing and monitoring eye health and disease states. In one example, a physician using these techniques would be enabled to monitor the health of corneal tissue in monthly intervals while the patient undergoes a healing process or a drug therapy and, if a sudden decrease of thickness is noted, the physician can more closely examine the affected portions of the patient's eye and prescribe remedial therapies immediately to aid the patient and the recovery of the eye tissues. In another example, in the acute, post-implant phase, the observed tissue volume changes over time may indicate a status of the wound healing during the post-implantation period. The edematous tissue volume may be observed to shrink and then return to a normal volume with anticipated wound healing and thereafter reach its pre-implant volume. In the chronic, device life phase, periodic monitoring of the tissue volume and tissue volume changes over time may identify incipient tissue loss that can result in the loss or malfunction of the implant without a second interventional surgery that would normally have been enacted to stabilize the tissue loss.

The aforementioned examples and implementations may be applied to detect additional or alternative conditions such as corneal ectasia, which is an abnormal thinning of the cornea and a sight-threatening condition that can cause permanent damage to the eye. Possible causes of corneal ectasia include keratoconus, pellucid marginal degeneration, keratoglobus, and laser eye surgery including but not limited to Lasik surgeries. Ectasia occurs in corneas that are already at risk, or in cases of corneas that are at risk by being naturally thinner than average. Average corneal thickness is approximately 540 microns centrally. Ectasia occurs when the flap formed from a Lasik surgery removes too much corneal tissue, causing weakening and thinning the remaining corneal tissue. Physicians typically prescreen Lasik surgery candidates to identify patients who are at risk of corneal ectasia, the process of which includes topography and pachymetry by OCT imaging combined with patient history to determine potential risks of ectasia. Physicians identify abnormalities in the cornea and pay particular attention to the thinnest point within the cornea as the area at risk for ectasia. Post-Lasik screening may also utilize OCT images to monitor corneal volume for areas of thinning and signs of ectasia. Like keratoconus, pre- and post-Lasik monitoring is challenging due to the challenge of manually connecting corneal topography and tissue volume calculations, and the manual analysis physicians perform to track these calculations over time. As such, the automated health map generation as disclosed herein may provide the benefit of more accurate and thorough tissue thickness or volume calculations and provide the results on the topographical map to visually display the most at-risk areas for corneal ectasia for the physician's review.

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

The devices, methods, and systems shown in the figures disclosed herein are provided as examples of the various features of the devices, methods, and systems and, although the combination of those illustrated features is clearly within the scope of invention, the examples and their illustrations are not meant to suggest the inventive concepts provided herein are limited from fewer features, additional features, or alternative features to one or more of those features shown in the figures. For example, in various embodiments, the method shown in FIG. 8 may include the other steps described with reference to FIG. 9 or 10, as well as additional or alternative processes as explained with respect to the other figures. It should also be understood that the reverse is true as well.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A corneal tissue health monitoring system comprising:
   a corneal measurement device configured to measure a first state of health indicator of a region of the corneal tissue during a first period of time and a second state of health indicator of the region during a second period of time after the first period of time, wherein the first state of health indicator is a first tissue density of the region, and the second state of health indicator is a second tissue density of the region; and
   a processing unit configured to receive the first and second state of health indicators from the corneal measurement device and generate a health map of the region based on the first and second state of health indicators, the health map indicative of a change between the first and second state of health indicators as measured from the first period of time to the second period of time in the region of the cornea.

2. The corneal tissue health monitoring system of claim 1, wherein the first and second state of health indicators are measured by obtaining cross-sectional images of the region of the corneal tissue at the first and second periods of time.

3. The corneal tissue health monitoring system of claim 2, wherein the cross-sectional images of the region of the corneal tissue at the first and second periods of time include:
   (a) a first set of cross-sectional images of the region taken at the first period of time and
   (b) a second set of cross-sectional images of the region taken at the second period of time,
   the processing unit further configured to compare the first set of cross-sectional images to the second set of cross-sectional images to generate the health map.

4. The corneal tissue health monitoring system of claim 1, wherein the region includes at least one sublayer of the corneal tissue that is being monitored, and the first state of health indicator and the second state of health indicator are associated with the at least one sublayer.

5. The corneal tissue health monitoring system of claim 4, wherein the at least one sublayer comprises one or more of: an external sublayer, internal sublayer, or an intermediate sublayer disposed between the external and internal sublayers.

6. The corneal tissue health monitoring system of claim 1, the processing unit further configured to calculate, based on the health map of the region, a rate of change between the first and second state of health indicators from the first period of time to the second period of time.

7. The corneal tissue health monitoring system of claim 6, the processing unit further configured to determine, based on the second state of health indicator and the rate of change of the region, a predicted state of health indicator of the region during a third period of time after the second period of time.

8. The corneal tissue health monitoring system of claim 1, the corneal measurement device further configured to measure one or more intermediate state of health indicators of the region between the first and second periods of time, wherein the health map is indicative of consecutive changes among the intermediate state of health indicators.

9. The corneal tissue health monitoring system of claim 8, the processing unit further configured to output the consecutive changes among the first state of health indicator, the second state of health indicator, and the intermediate state of health indicators as a graph with respect to time.

10. The corneal tissue health monitoring system of claim 1, the processing unit further configured to locate, on the health map, at least one subregion within the region of the cornea exhibiting a change in the first and second state of health indicators exceeding a threshold range,
the corneal tissue health monitoring system further comprising a user interface configured to display the at least one subregion superimposed on the health map.

11. The corneal tissue health monitoring system of claim 1, further comprising a memory unit configured to store a list of corneal diseases,
the processing unit further configured to determine, based on the health map and the change between the first and second state of health indicators, a diagnosis on the region of the corneal tissue, the diagnosis selectable from the list of corneal diseases stored in the memory unit, and
the corneal tissue health monitoring system further comprising a user interface configured to display the diagnosis and the health map.

12. The corneal tissue health monitoring system of claim 11, further comprising:
a user interface configured to display the health map of the region as a user-interactive map, receive user input, and display additional information corresponding to the received user input.

13. The corneal tissue health monitoring system of claim 12, the user interface further configured to open a new window displaying the additional information in response to detecting the user input, wherein the additional information is a user-selected cross-sectional image of the region on the user-interactive map.

14. The corneal tissue health monitoring system of claim 1, wherein the health map is a topographic map of the region.

15. The corneal tissue health monitoring system of claim 1, further comprising a user interface, wherein the processing unit is configured to:
calculate a percentage change between the first state of health indicator of the region and the second state of health indicator of the region, wherein the first state of health indicator is associated with the first period of time before a corneal implant is implanted, and the second state of health indicator is associated with the second period of time after the corneal implant is implanted;
determine that the percentage change is below a predetermined threshold; and
display, on the user interface, a notification that the region of the cornea is experiencing tissue loss after the corneal implant.

16. The corneal tissue health monitoring system of claim 1, wherein the first state health indicator further includes a first tissue thickness of the region and the second state of health indicator further include a second tissue thickness of the region.

17. The corneal tissue health monitoring system of claim 1, wherein the first state health indicator further includes a first tissue volume of the region and the second state of health indicator further include a second tissue volume of the region.

* * * * *